PROB. DENSITY
OF TRANSITION
PULSES

SYMBOL
CLOCK
LEAD 121

SAMPLING
PULSE
LEAD 194

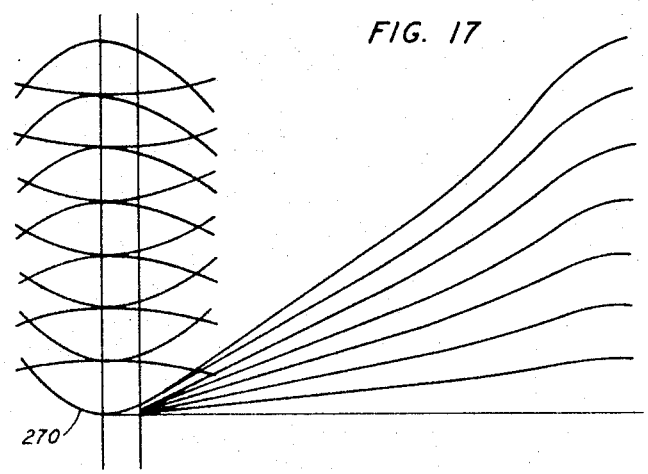
FIG. 17
FIG. 18
PROB. DENSITY
OF TRANSITION
PULSES
271
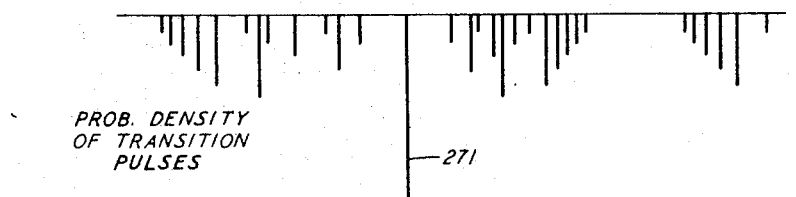
SHIFTED
SYMBOL CLOCK       FIG. 19
LEAD 121
SHIFTED
SAMPLING PULSES    FIG. 20
LEAD 194
SHIFTED
APERTURE PULSES    FIG. 21
LEAD 108
APERTURE PULSES    FIG. 22
LEAD 108
SAMPLING PULSES    FIG. 23
LEAD 194

EQUALIZER OUTPUT

OUTPUT RECTIFIER 207

OUTPUT RECTIFIER 208

OUTPUT RECTIFIER 209

SLICER 210

SLICER 211

SLICER 212

SLICER 213

United States Patent Office 3,462,687
Patented Aug. 19, 1969

3,462,687
AUTOMATIC PHASE CONTROL FOR A MULTI-LEVEL CODED VESTIGIAL SIDEBAND DATA SYSTEM
Floyd K. Becker, Colts Neck, and Frank W. Lescinsky, Middletown Township, Monmouth County, N.J., assignors to Bell Telephone Laboratories, Incorporated, New York, N.Y., a corporation of New York
Continuation of application Ser. No. 459,589, May 28, 1965. This application Apr. 17, 1968, Ser. No. 722,137
Int. Cl. H04b 1/10
U.S. Cl. 325—42                              23 Claims

ABSTRACT OF THE DISCLOSURE

A data transmission system employing vestigial sideband modulation and multilevel coding is provided to ensure efficient bandwidth utilization. An automatic transversal filter equalizer is coordinated with automatic phase and symbol recovery circuits during an initial start-up sequence to provide a reconstituted data signal at a receiver.

---

This is a continuation of application Ser. No. 459,589, filed May 28, 1965, by Floyd K. Becker and Frank W. Lescinsky and now abandoned.

This invention relates to automatic phase control circuits. More particularly, the invention relates to circuits for securing a predetermined phase relationship between two electrical signal waves having different characteristics.

In certain transmission systems it is necessary to utilize a locally produced oscillation wave to control the sampling of another electrical signal wave. The latter signal wave may, for example, be a data information wave or other similar type of wave useful in a voice transmission system. In such arrangements it is necessary to achieve an initial phase pull-in between the oscillation and signal waves and thereafter to maintain a predetermined phase relationship between them in spite of dynamic disturbances which can alter the initial phase conditions.

It is usually advantageous to accomplish phase control between two electric signal waves by automatic arrangements so that it is not necessary for an attendant to maintain constant surveillance of the phase relationships. However, automatic phase controlling arrangements heretofore known in the art do not have the phase controlling capabilities which can match the known techniques in associated art areas with which cooperation is usually required in signal transmission systems. For example, known techniques for optimizing the utilization of signal channel bandwidths, for modulation methods, and for automatic equalization, have made it possible to transmit information at information rates which are far in excess of those with which known automatic phase control techniques can cope.

Certain prior art phase control systems achieve phase control by supervising signal wave zero axis crossings or by supervising some wave characteristic which is related in a fixed manner to zero axis crossings of the wave. However, these systems are generally not capable of handling signal transmissions in, for example, a high speed multilevel data transmission system. The reason is that in systems of that type it is necessary to sample the signal periodically to extract the transmitted information and the optimum sampling time is not necessarily related to the zero axis crossings of the wave in a fixed manner. Signal distortion, even after equalization, often causes the optimum signal wave sampling time to be shifted to a substantial degree from its theoretical optimum position in the wave, and such shifts often vary in a dynamic fashion for any given signal transmisison. Consequently, it is not practical to build into a system fixed compensation for distortion which is continually changing.

It is, therefore, one object of the present invention to improve electric signal phase control systems.

It is another object to improve automatic arrangements for controlling the phase relationship between two electric signal waveforms.

A further object is to control the phase relationship between two electric signal waves in a manner such that the accuracy of the phase control is relatively independent of signal distortion.

These and other objects of the invention are realized in an illustrative embodiment in which the phase of a first electric signal wave is adjusted into a predetermined relationship with respect to the phase of a second wave by a combination of digital and analog techniques. A predetermined signal amplitude characteristic of the second wave is detected, and its effects are integrated in digital circuits and utilized to generate an analog control signal that is applied to a voltage controlled delay circuit through which the first signal wave is transmitted.

One form of the invention utilizes in the digital circuits a reversible binary counter that has its direction of operation peroidically switched by the first signal wave. The aforementioned signal amplitude characteristic of the second wave is utilized to produce a train of characteristic-representative pulses for driving the counter. Output signals from the counter are converted to an analog signal for controlling the phase of the first signal wave.

It is one feature of the invention that the use of a periodically reversing digital counter which is driven in response to a recurrent input signal wave characteristic causes phase control to be symmetrically and convergently exercised with respect to such characteristic.

It is another feature of the invention that in different aspects of the circuit phase control is exercised with respect to one or more characteristics of one of the signal waves. Examples of such characteristics are the peaks of a train of recurring pulses, a signal wave time of high probability of signal transition through signal slicing reference levels, and a signal interval time slot of low probability of signal transition through signal slicing reference levels.

A further feature is that in arrangements wherein a counter is driven by counting impulses representing second signal transitions through a predetermined set of discrete amplitude levels, the effects of second signal wave distortion on first wave phase adjustment are compensated by generating in response to the first wave a train of pulses defining a recurrent time slot about which the convergent phase adjustment is achieved by causing transition pulses which are coincident with time slot pulses to drive the counter in larger steps than do other transition pulses.

Yet another feature of the invention is that, in systems utilizing an automatic equalizer, the equalizer and the phase adjusting circuits provide cooperative control of each other to coordinate the initialization requirements of each such circuit.

An additional feature is that a density detector is provided to inhibit the operation of the phase control circuits when insufficient signal transitions through predetermined reference amplitude levels are occurring to provide accurate phase information.

A more complete understanding of the invention may be obtained from a consideration of the following detailed description when considered in connection with the appended claims and the attached drawings in which:

FIG. 1 is a simplified block and line diagram of a transmission system receiving terminal utilizing the present invention;

FIGS. 2, 3, and 4 are wave diagrams illustrating certain relevant characteristics of a data signal wave in connection with which the invention may be advantageously employed;

Figure 28:
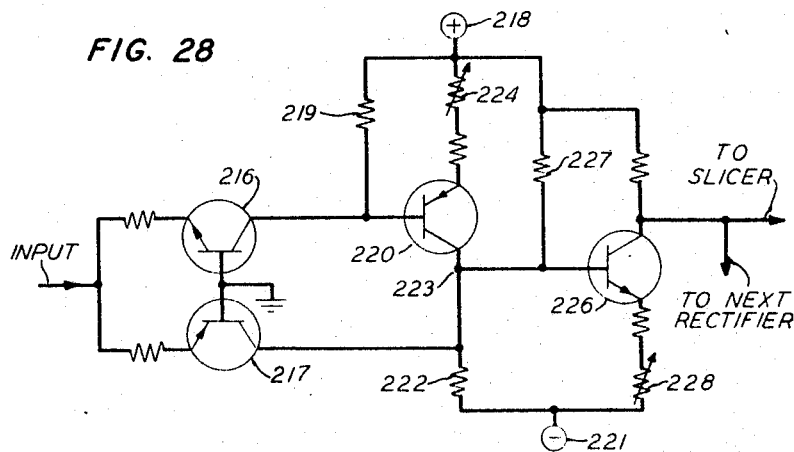
Figure 29:
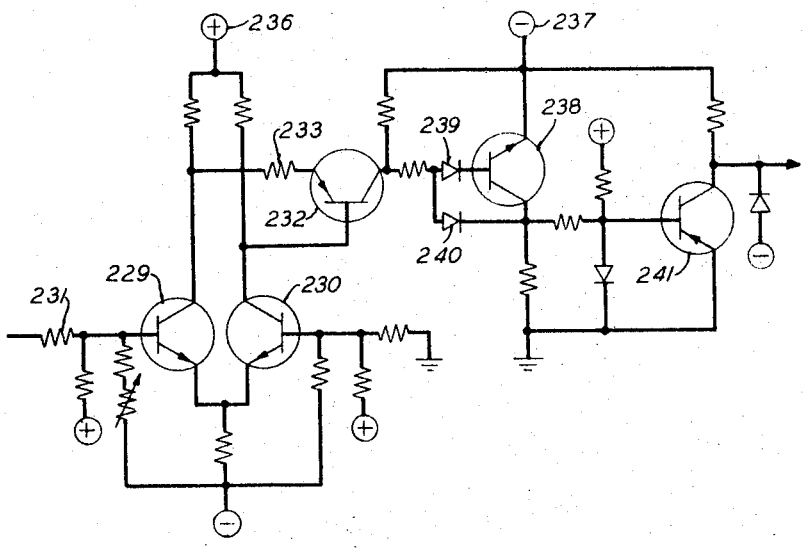
Figure 30:
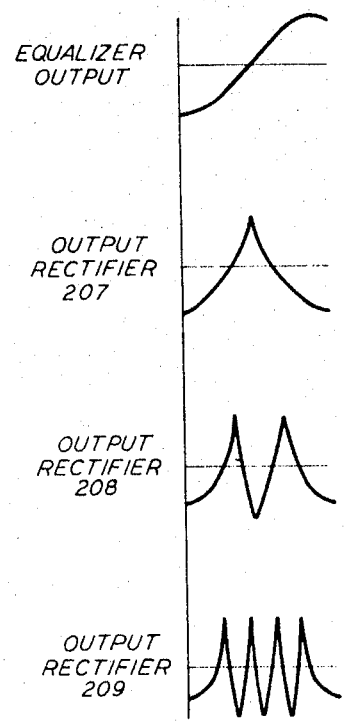
Figure 31:
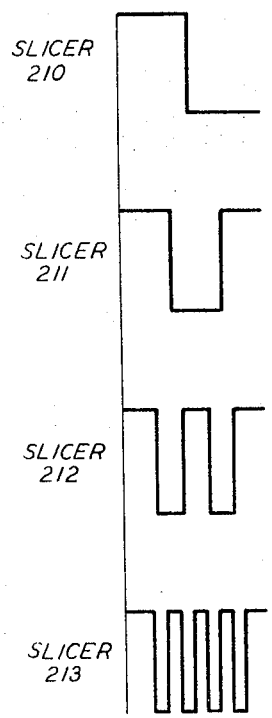
Figure 34:
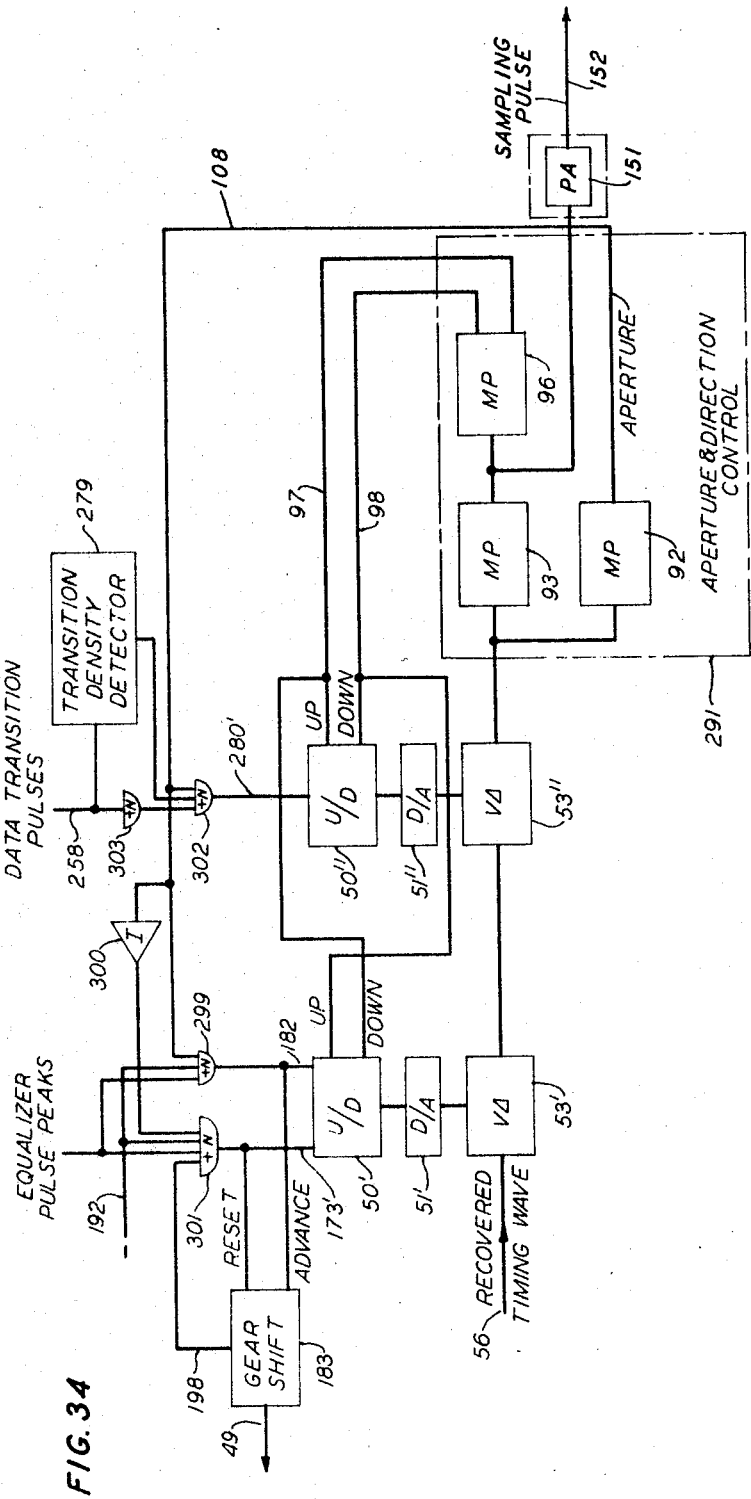

FIGS. 13 through 25 includes diagrams illustrating the operation of the invention;

FIGS. 26 through 29, 32, and 33 include schematic diagrams of portions of the circuits in FIGS. 6 through 10;

FIGS. 30 and 31 are wave diagrams illustrating the operation of circuits in FIGS. 28 and 29; and FIG. 34 includes a simplified block and line diagram of an additional embodiment of the invention.

The invention is described in connection with a multilevel vestigial sideband data transmission system of the type disclosed and claimed in the copending application of F. K. Becker Ser. No. 459,659 filed May 28, 1965, now U.S. Patent No. 3,401,342 and entitled, "Suppressed Carrier Transmission System for Multilevel Amplitude Modulated Data Signals." However, the invention is not limited to use in such systems.

Figure 1:
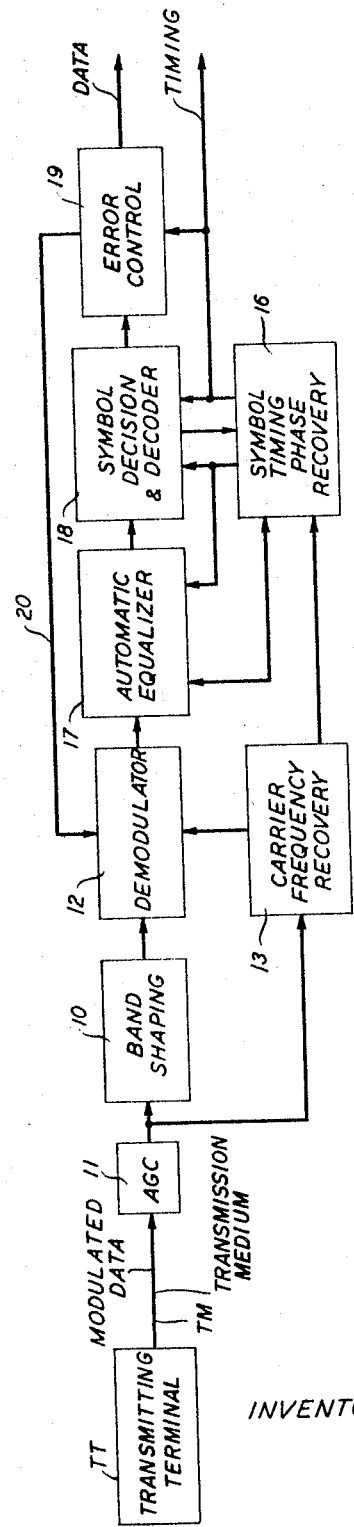
Figure 6:
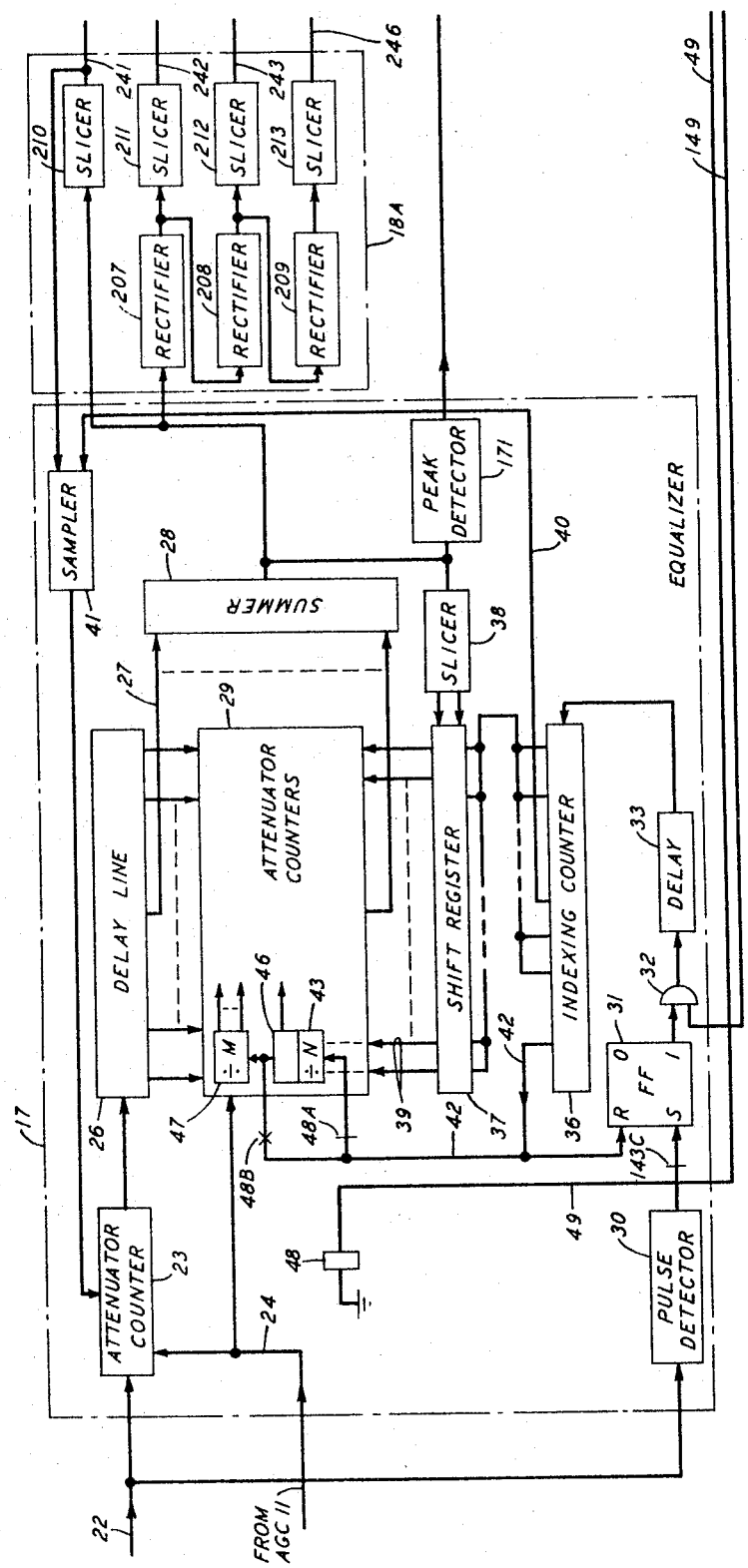

FIG. 1 is similar to FIG. 6 of the aforementioned Becker transmission system application and illustrates one type of system in which the phase control concepts of the present invention are useful. In FIG. 1 herein a band-shaping filter 10 provides spectrum limiting filtering which supplements similar filtering provided in a transmitting terminal, TT., to achieve a raised cosine signal spectrum at the input to a demodulator 12. These input signals are advantageously multilevel-coded data signals that amplitude modulate a carrier frequency wave having a frequency advantageously selected according to the characteristics of the transmission medium T.M. In the illustrated embodiment, the carrier frequency was equal to the symbol rate; but this is not essential to the operation of the invention. The modulated signals are transmitted by a vestigial sideband transmission system. The carrier frequency is suppressed in the modulator and must be regenerated in the receiving terminal for demodulation purposes. Pilot tones are transmitted along with the data signal, as is known in the art.

Each train of transmitted information signals is preceded by an initialization period which is utilized to prepare receiving terminal circuits for subsequent data transmission. For example, an interval of steady carrier and pilots is sent for initializing phase recovery circuits such as those to be described herein. In addition, a series of standard pulses is transmitted for initializing an automatic equalizer; and an interval of data framing pulses is transmitted for initially synchronizing error control circuits.

An automatic gain control circuit 11 stabilizes signal amplitude levels prior to the application of the signals to a band-shaping filter 10. Pilot frequencies received along with the incoming signal are utilized in a carrier frequency recovery circuit 13 for providing particular carrier harmonics to the demodulator 12 and to a symbol timing wave phase recovery circuit 16. The latter circuit adjusts the phase of the recovered timing wave to an optimum condition for utilization in an automatic equalizer 17 and a symbol decision and decoding circuit 18. The latter circuit extracts the digital data information from the equalized and demodulated multilevel signals and applies such data to an error control circuit 19. The latter circuit advantageously corrects a limited number of errors which may occur in the decoded signal and detects almost all errors in excess of that number. If excessive errors are detected, a signal is sent back to the transmitting terminal requesting a retransmission, as is well known in the art. However in accordance with the present invention, the error control circuit 19 also supplies certain signals on a circuit 20 to the demodulator 12 to indicate that massive errors have occurred and a test phase reversal of the demodulator carrier should be accomplished.

Before considering the phase control circuits of the present invention it is helpful to consider input signals of the type with which the circuits are advantageously employed. Such signals are illustrated in different forms in FIGS. 2, 3, and 4.

Figure 2:
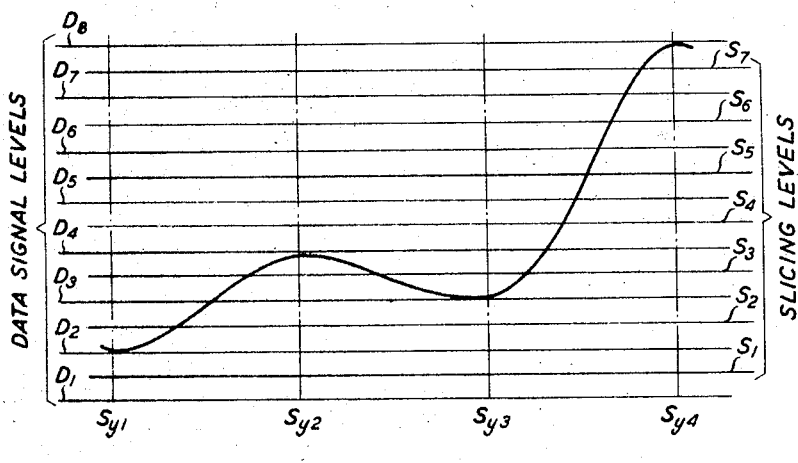

FIG. 2 is a trace of a several-symbol portion of a multilevel data signal superimposed on a grid of timing and amplitude intervals. Each vertical line represents an ideal symbol sampling time $Sy1$ through $Sy4$. Horizontal lines extending beyond the trace to the left are eight information-determinant data signal levels $D1$ through $D8$ and the level coded symbols may assume any one of them at sampling time. Similar lines extending beyond the trace to the right are seven slicing levels $S1$ through $S7$. Typically level $S4$ is a zero slicing level while levels $S5$ through $S7$ are positive and $S1$ through $S3$ levels are negative. The signal crosses a slicing level each time it passes between two information-determinant levels. At each symbol sampling time the signal evidences a relatively stable amplitude portion of substantially zero slope. It is apparent that small amplitude or phase changes can easily cause errors by displacing a part of the traces with respect to the amplitude-timing grid of FIG. 2.

Figure 3:
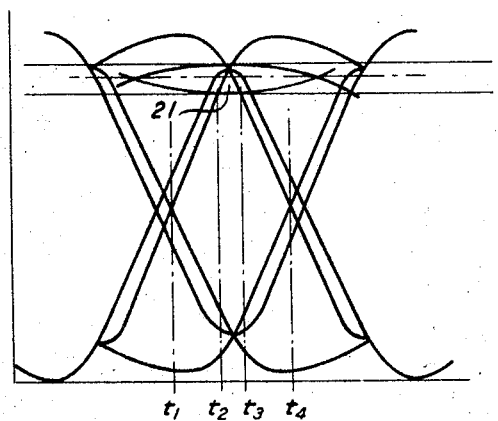
Figure 4:
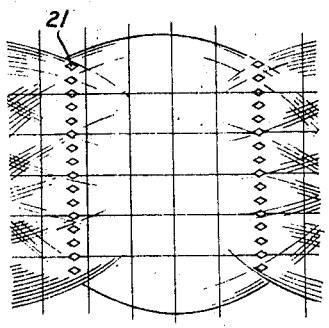

FIG. 3 and 4 represent synchronously superimposed traces of successive data signal segments which form characteristic eye patterns as known in the art. In such patterns the information-determinant portion of the signal is momentarily at a meaningful level in the eye so that the signal may be sampled at the eye to obtain sampling information that can be decoded to derive the original level coded data. In FIG. 3 there is shown a greatly simplified eye pattern for a conventional two-level, i.e., binary, data signal. Superimposed thereon, but not to scale, is a single eye of an eye pattern from a sixteen-level data signal. The small, rather triangular section 21 of the superimposed pattern represents the only portion of one of the eyes in the sixteen-level eye pattern which can be utilized because of the large number of signal transitions on widely different amplitude levels. From a time standpoint the two-level binary eye extend from the time $t_1$ to the time $t_4$ in FIG. 3, and the single sixteen-level eye extends between the times $t_2$ and $t_3$.

FIG. 4 shows the eye pattern for two symbol intervals of the sixteen-level data signal of the type which is involved in the circuits of the present invention as herein described. The total time span of the two illustrative symbol intervals includes $\frac{1}{1200}$ of a seconds, and the total time span of a single symbol interval cover only $\frac{1}{2400}$ of a second. One should notice, for example, with respect to the single eye 21 which is also illustrated in enlarged form in FIG. 3, the relative magnitude of th eye from a time standpoint as compared to the entire symbol interval and from an amplitude standpoint as compared to the total potential amplitude swing of the full data signal. In the receiving data terminal of FIG. 1 the data sampling is done within the eye; and each of the fifteen different amplitude slicing levels, one for each of the fifteen eyes in a particular symbol intervals, is at approximately the center of the eye.

The eye pattern of FIG. 4 was observed for transmission under excellent transmission conditions. Thus, it can be seen that any lingering distortion in a data signal at the time of decoding can very easily shift the signal trace position with respect to the eyes in the eye pattern to cause the eye to be either partially or completely closed. Similarly, small amounts of phase jitter in the sampling time for detecting signal samples in the eye can cause the eye to be completely missed. The circuits of the data receiver terminal in FIG. 1 are adapted to operate accurately with respect to sixteen-level data signals of the type illustrated in FIG. 4, but which are subject to factors of lingering distortion and possible phase jitter as previously indicated, but not illustrated, in FIG. 4.

Figure 5:
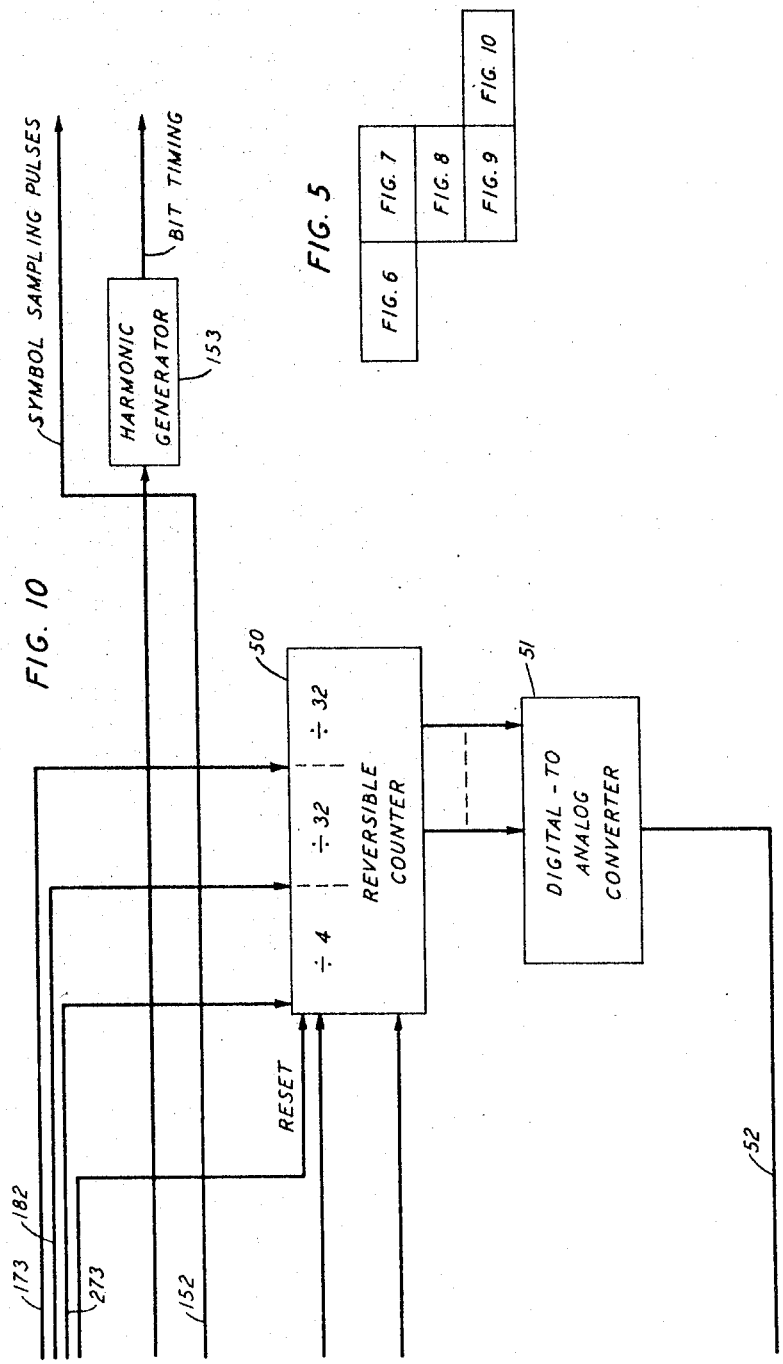
FIG. 5 is a diagram illustrating the manner in which FIGS. 6 through 10 may be combined to form a composite block and line diagram of a portion of the circuits of FIG. 1 including the invention.

FIGS. 6 through 10 may be assembled as shown in FIG. 5 to form a composite circuit diagram of the equalizer 17 and phase recovery circuits 16 to see their cooperation in more detail.

AUTOMATIC EQUALIZER

FIG. 6 includes a partial diagram of the automatic equalizer 17 which is of the type shown in a copending application of F. K. Becker, R. W. Lucky, and E. Port which is entitled "Automatic Equalizer for Digital Transmission System" and is otherwise designated application Ser. No. 396,836, filed on Sept. 16, 1964, now Patent No. 3,292,110. FIG. 6 also includes the rectifiers and slicers of the symbol detecting and decoding circuits 18. Equalizer 17 is similar to the Becker et al. equalizer in that it receives input data on a circuit 22 from the demodulator 12. The data is coupled through an attenuator counter 23 which performs an automatic gain control type of operation for the equalizer. From the counter 23 the data passes through a tapped delay line 26 and is coupled therefrom over one tap circuit 27 to a summer 28 and over a plurality of additional tap circuits through a set of attenuator counters 29 to the summer 28. Data pulse peaks are detected in a circuit 30 which sets a control flip-flop 31.

The ONE output of a flip-flop 31 enables a coincidence gate 32 to couple a recovered clock frequency signal timing wave from the symbol phase recovery circuits 16 in FIGS. 7 through 10 to a one-half period delay circuit 33. This timing wave is advantageously at the symbol rate of the demodulated data. The timing pulses in the output of delay 33 advance an indexing counter 36 during the equalizer training period portion of the start-up operation. When standard pulses are being supplied to the receiving terminal, the counter 36 supplies ADVANCE pulses to a shift register 37 that is receiving binary signals at its input from a zero level slicer 38. The outputs of the various stages of shift register 37 are applied to counting circuits in the attenuator counters 29 for controlling the direction of operation thereof as described in the Becker et al. equalizer application. Thus the output circuits 39 couple direction control information from the last stage of shift register 37 to the attenuator counter in the counters 29 which corresponds to the first tap on delay line 26. The binary representations of polarity of portions of standard pulses that have traveled through the delay line 26 are moved through shift register 37 by the recovered clock frequency signals from counter 36 to control the direction of operation of the counters 29. An intermediate output connection 40 on the indexing counter 36 enables a sampler 41 to utilize the output of a slicer 210 in the symbol detecting and decoding circuits for controlling the attenuator counter 23 to accomplish the aforementioned equalizer automatic gain control function. The connection 40 is the one which corresponds to the tap circuit 27 on the delay line 26.

Each time counter 36 completes a cycle of operation an output pulse is produced on a circuit 42 which resets the flip-flop circuit 31 to terminate the flow of clocking pulses to the counter 36. The signal on circuit 42 is also applied to the attenuator counters to operate such counters in the direction indicated by the outputs received on control circuits, previously mentioned, from the shift register 37. Within the attenuator counters 29 there is a separate reversible binary counter for each of the taps except the tap circuit 27, from delay line 26. One such counter is illustrated in simplified block and line diagram form, to show the modification thereof from the aforementioned Becker et al. equalizer application in a manner which has been found to be advantageous in accordance with the present invention.

The illustrated one of the counters 29 includes a plurality of binary counting stages. A first group 43 of such stages divides by a factor N and is advantageously the four least significant stages of a total of twelve counter stages. The group 43 is adapted to perform a low level integration for averaging out the reversible counting effects which may take place as a result of the occurrence of noise near the symbol interval portion corresponding to the illustrated tap counter in the counters 29. The N stages 43 drive the other additional stages, each of which is provided with an output connection for operating relays, not shown, to control the impedance in an attenuator network, not shown, in the manner described in the Becker et al. equalizer application. In accordance with the present invention, the first stage which follows the group 43 is the stage 46, and that stage drives a further group 47 of stages for accomplishing the further division by the factor M. The group 47 in the example illustrated includes seven stages, the stage 46 being the eighth stage, and the group 43 of stages including the four additional stages to make up the total of twelve included in the illustrated counter.

The output of indexing counter 36 is coupled by means of the lead 42 to the illustrated counter, as well as all other counters, in the attenuator counters 29. At each counter the lead 42 can be applied either to the input of the first of the integrating group 43 of counter stages or to the input of the first of the final group 47 of counter stages. The selection of the particular point of application of the signal from counter 36 to the stages of the attenuator counters 29 is controlled by a relay 48. Relay 48 is a timed type of relay which receives an actuating signal in this case from the symbol phase recovery circuits 16 and atomatically drops out a predetermined time after having received the input signal. This type of relay is well known in the art.

Normally closed contacts 48A of the relay are included in the input connection from counter 36 to the counter stage group 43 so that the output of counter 36 is normally applied to the least significant stage of each of the counters in attenuator counters 29. Relay 48 also has a set of normally open contacts 48B which are in the input to the least significant one of the stage group 47 to couple the output of counter 36 thereto. Thus, when the relay 48 has been operated, the pulses from counter 36 are given extra heavy weighting because they are applied through the contacts 48B directly to the most significant group of stages 47 in each of the attenuator counters 29. This causes equalizer 17 to operate in response to the standard training pulses received from the transmitter at an extremely rapid rate and achieve approximate equalization quickly in coarse steps. However, after relay 48 has timed out, the pulses from counter 36 are applied to the attenuator counters 29 through the contact 48A to the least significant stages thereof to perform fine equalization in small steps. Relay 48 is actuated once during each start-up operation of the data transmission system, and this operation takes place in response to a symbol gear shift signal coupled to the relay on a circuit 49 from the symbol phase recovery circuits 16 in a manner which will be hereinafter described.

SYMBOL PHASE RECOVERY CIRCUITS—GENERAL

Figure 24:
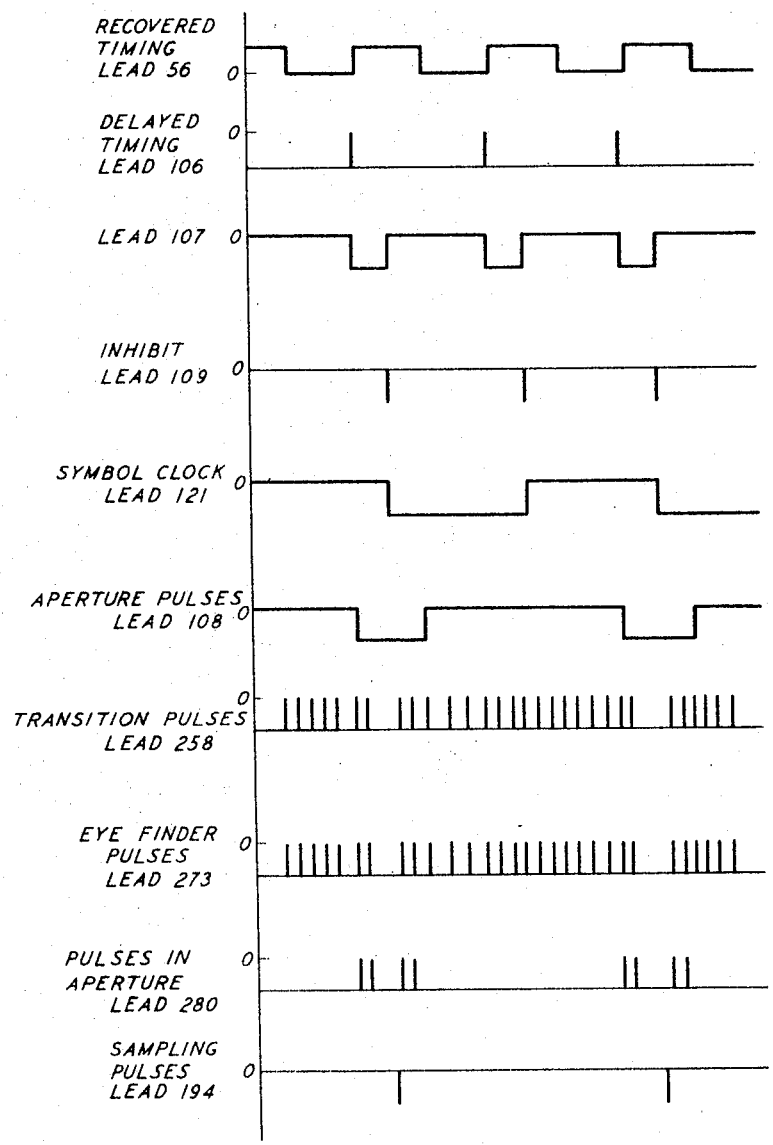
Figure 25:
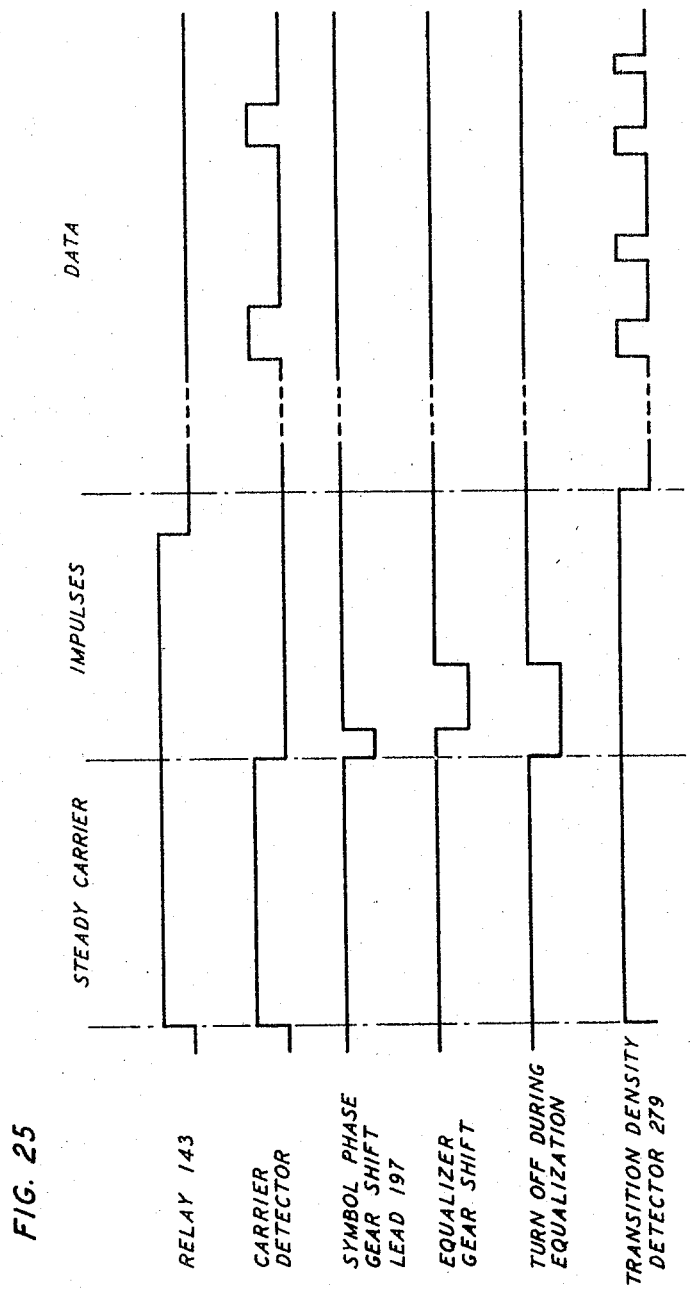

In FIGS. 7 through 10 the block and line details of the symbol phase recovery circuits 16 are illustrated. These circuits have been generally described with reference to FIG. 1. They receive in input connections a timing signal which is a harmonic of the data symbol rate. They also receive control signals from the equalizer 17 and data signals. The phase recovery circuits 16 produce output timing to the symbol detecting and decoding circuits 18, and they also provide timing to a subscriber station, not shown, which receives decoded data. In addition, the phase recovery circuits 16 provide cooperative control signals to the equalizer 17. FIGS. 13 through 25 include diagrams illustrating the manner of operation of the symbol phase recovery circuit 16. In FIG. 25 is included a set of timing diagrams indicating the presence or absence of certain conditions and illustrating the operation of the circuits 16 during start-up functioning of the receiver terminal. FIG. 24 is a similar set of timing diagrams for operation of the circuits 16 during the time when data is being received. FIGS. 13 through 23 illustrate specific details of the circuit operation depicted in FIG. 24. All of the FIGS. 13 through 25 are referred to from time to time in the subsequent discussion of the symbol phase recovery circuits 16.

In FIGS. 7 through 10 the circuits are indicated in block and line form utilizing a number of logic circuit blocks which are of types well known in the art. Other circuit blocks are illustrated in schematic form in FIGS. 11A through 11C, 12A and 12B, 26 through 29, 32, and 33. Each circuit type will be described briefly when first encountered in the description of FIGS. 7 through 10.

It is convenient to consider the symbol phase recovery circuits 16 as including three signal channels. The three signal channels are separated in FIGS. 7 through 9 by heavy horizontal broken lines. The upper channel is the Data Channel, and the other channels are the Gear Shift Channel and the Timing Channel. All three channels are utilized for controlling the operation of a conventional reversible binary counter 50 which integrates signal characteristic signals applied thereto from the Gear Shift and Data Channels. Counter 50 supplies signals to a digital-to-analog converter 51. The converter produces a direct-current control signal on a circuit 52 which is coupled to a voltage-controlled variable delay circuit 53 for controlling the amount of delay produced by the latter circuit.

Although counter 50 is conventional there is one aspect of its arrangement which is noteworthy. The full counting range of the counter which affects the delay circuit 53, and the phase shifting range of that delay circuit, are each greater than 360 electrical degrees in the input timing wave to the symbol phase recovery circuits. Thus, if it is under some conditions necessary for the circuits to operate at or near the 360-degree delay point, it is not necessary for counter 50 to spill over each time that it advances through such point during hunting about the point. A 400-degree range is advantageously employed for both circuits. If operation is required about the 400-degree point, counter 50 resets the first time that it advances through the 400-degree point and then advances to operate about the equivalent 40-degree condition. This avoids repetitive phase errors that can be generated if the counter is required to hunt about one of its extreme counting conditions.

External connections to the counter 50 are also noteworthy. It can be driven at different rates by selecting input driving connections to counter stages of different counting significance in a manner which will be described. Output connections are derived from only a most significant portion of the counter stages so that the stages of lesser significance effectively integrate to reduce the ultimate effect of unimportant signal perturbations.

SYMBOL PHASE RECOVERY CIRCUIT—TIMING CHANNEL

The timing wave at a harmonic frequency of the symbol rate is supplied on a circuit 56. This wave is advantageously at a frequency of 4800 cycles per second and is produced by the frequency recovery circuit 13 in FIG. 1. The timing wave is applied to the input of the variable delay 53. The latter circuit and the converter 51 are shown in detail in FIG. 26.

Figure 26:
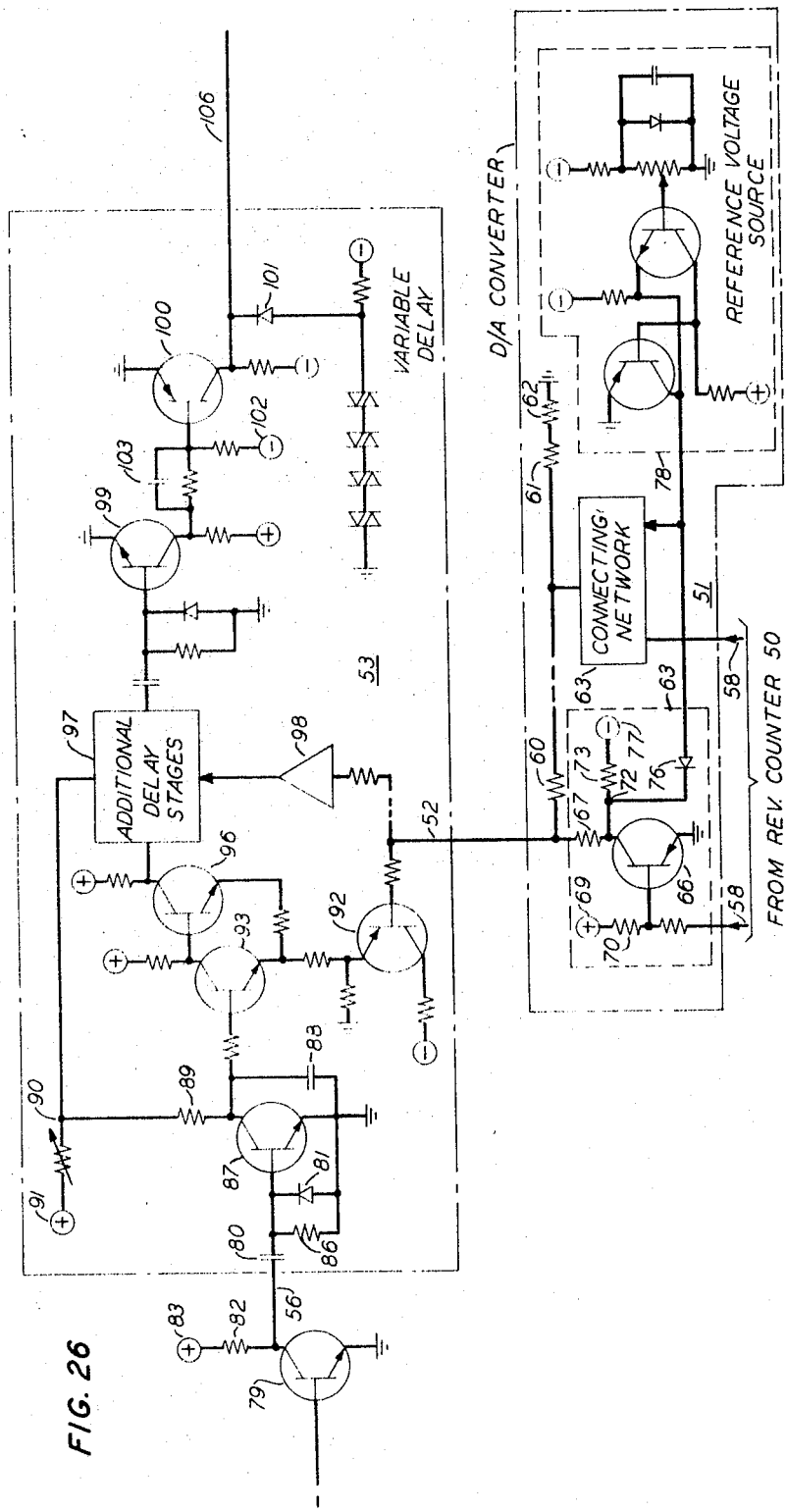

In FIG. 26 the digital-to-analog converter 51 receives output signals from the reversible counter 50 on a number of output leads 58, only two of which are shown in FIG. 26. The leads 58 advantageously represent outputs from certain of the most significant stages of the counter 50, and in one particular embodiment they represent outputs from the nine most significant stages of a twelve-stage reversible binary counter. The converter 51 includes a ladder type impedance network which is connected between an output lead 59 of the converter and ground. In FIG. 26 three of the ladder series path resistors 60, 61, and 62 are shown. Shunt path resistors for such network are coupled thereto by means of a plurality of shunt circuit connecting networks 63, only one of which is shown in detail in FIG. 26, since all are of essentially the same configuration.

Each of the circuits 63 includes a transistor 66 which is connected in a common emitter circuit configuration with its emitter electrode connected to ground and its collector electrode connected to the series path of the ladder impedance network by means of a shunt path resistance element 67. The transistor 66 is normally biased in a nonconducting condition in the absence of a negative output signal from the counter 50 by means of the output of a positive potential source 69. That source is connected to the base electrode of transistor 66 by a resistor 70. The source 69 is indicated schematically by a circled plus sign which represents a suitable source of positive potential with its positive terminal connected to the circuit point indicated by such circle, and with its terminal of opposite polarity connected to ground. A similar type of schematic representation is employed throughout the drawings for positive and negative sources.

In the absence of a signal from counter 50 as aforementioned the transistor 66 is nonconducting. Under such conditions a negative potential is present at the collector electrode of transistor 66 as a result of a connection to a circuit point 72 on a potential divider including a resistor 73 and a diode 76 which are connected in series between a source 77 of relatively large negative potential and a voltage reference source 78 which supplies a relatively smaller stabilized negative voltage to all of the circuits 63 in the manner illustrated. A negative signal from counter 50 biases the transistor 66 into conduction and thereby places ground potential at its collector electrode. Thus, each circuit point along the ladder impedance network, at which a shunt branch is connectable by means of a circuit 63, may experience either the aforementioned negative potential or ground. The cumulative effect of all of these potentials represents a variable control voltage on the lead 59 which is applied to the variable delay circuit 53 for controlling the operation thereof. This control signal may have any one of a plurality of different amplitude levels representing respectively the hundreds of different output conditions of the counter 50.

Delay circuit 53 comprises a plurality of trigger circuits, each of which has a threshold of operation that is controlled by the voltage on the aforementioned circuit 52 from the digital-to-analog converter 51. The timing wave at twice the symbol rate of the data appears on circuit 56 each time that a transistor 79, in recovery circuit 13, is biased off. That transistor is connected in a common emitter circuit and provides a low impedance discharge path for a capacitor 80. The capacitor discharges through the collector-emitter path of transistor 79 and through ground and a diode 81. At the end of the negative-going portion of the timing wave on lead 56 transistor 79 has returned to a nonconducting condition and capacitor 80 begins to charge through a resistor 82 from a positive potential source 83. The charging current in capacitor 80 initially develops a positive potential across a resistor 86 which potential thereafter biases a transistor 87 into conduction.

Transistor 87 remains in conduction for a controlled time interval which is a function of the time constant of the capacitor 80 and the resistor 82. During such conduction interval the transistor 87 provides a low impedance discharge path for a further capacitor 88 connected between its collector and emitter terminals. As soon as transistor 87 is biased to a nonconducting condition, i.e., when the charging current for capacitor 80 is no longer of sufficient magnitude to sustain conduction in transistor 87, the latter transistor is biased to a non-conducting condition. At this time capacitor 88 begins to charge through a collector resistor 89 of the transistor 87, from the positive potential at terminal 90, which is positively biased from a positive potential source 91. The potential at the terminal 90 is similarly applied to all of the threshold stages in the variable delay circuit 53.

The threshold control voltage on circuit 52 is applied to the one stage of delay circuit 53 which is illustrated in detail by means of an emitter follower amplifier including a transistor 92. The emitter electrode of the latter transistor is coupled to the emitter circuit of a pair of transistors 93 and 96 which are arranged in a regenerative threshold detecting circuit. As soon as the charge on capacitor 88 attains a sufficient magnitude to exceed the threshold potential developed at the emitter electrode of transistor 92, the transistor 93 is biased into conduction and causes the transistor 96 to be biased to a nonconducting condition. The resulting positive-going potential at the collector electrode of the transistor 96 is coupled to the next succeeding stage in the variable delay; and all of such stages, which are similar to the one just described, are indicated by the block 97 in FIG. 26. Such additional stages receive their threshold control voltage from the circuit 52 via separate emitter follower amplifiers 98 for each such additional threshold stage.

The positive-going output from the last of the additional stages 97 actuates a further common emitter amplifier stage including a transistor 99 and which stage is similar to the circuitry of the aforementioned transistor 87. Output signals from transistor 99 actuate a further common emitter inverting stage 100 which supplies the variable delayed output at the collector electrode thereof. This output has a maximum negative voltage clamp provided at a relatively small negative voltage by virtue of the connection to such collector electrode of the clamp diode 101. Transistor 100 is normally biased in a non-conducting condition by the positive potential at the collector electrode of the transistor 99 which is also normally nonconducting. Each positive-going signal transition from the stages 97 turns the transistor 99 on momentarily and the ground at its collector electrode is coupled through a speed-up capacitor 103 to the base electrode of transistor 100 for biasing that transistor into a conducting condition and thereby producing a ground output voltage spike at the collector electrode of transistor 100.

Counter 50, converter 51, and delay 53 are advantageously arranged to control timing wave phase in steps of less than one electrical degree thereof. In a typical system application for satisfactorily low error rate, the eye width in a sixteen-level eye pattern was about 20 degrees. They also exercised control over a total range of greater than 360 degrees as will be subsequently described.

Figure 12A:
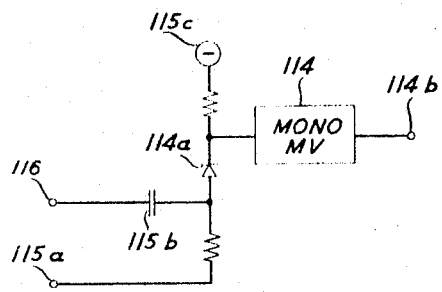
Figure 12B:
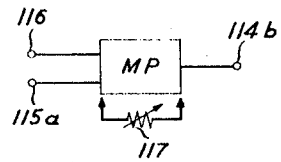

The output of delay 53 is applied on the circuit 106 to drive an aperture generator 57. The generator 57 includes a plurality of trigger circuits which are arranged in accordance with well known design techniques to produce three different output pulse trains on circuit leads 107, 108, and 109. The trigger circuits are advantageously three monopulsers 111, 112, and 113 of the type illustrated in FIG. 12A. In the latter figure, a capacitor-diode coincidence gate controls the input to a conventional monostable multivibrator 114. A voltage level input terminal 115A receives a ground assertion level signal to enable the gate. A positive-going signal transition at an input terminal 116 actuates the gate and a capacitor 115B couples a positive pulse through a diode 114A to trigger multivibrator 114. A negative level at terminal 115A disables the gate because now a positive-going transition at terminal 116 is unable to turn on diode 114A. The multivibrator output can be selected either positive-going or negative-going as is known in the art. FIG. 12B shows the schematic symbol used for the monopulser of FIG. 12A, and indicates an adjustable resistor 117 which may be included therein to indicate adjustable multivibrator time constant.

The monopulsers respond when triggered by producing an output pulse of duration corresponding to the monopulser time contants. The monopulsers 111 and 113 have variable resistors connected thereto for indicating that their time constants are selected in accordance with the binary digit rate of data to be supplied by the illustrated receiving terminal.

All three output trains of generator 57 are illustrated in FIG. 24. A first output is applied on circuit 107 to drive a conventional countdown circuit 110 which divides the frequency by two. Circuit 110 includes a bistable multivibrator 118 with a complementing input connection to lead 107 which is the output of monopulser 111.

The binary ONE and ZERO outputs of multivibrator 118 are coupled through two positive diode NOR gates 119 and 120 to a pair of output leads 121 and 122 of the dividing circuit 110. The NOR gates 119 and 120 are of the type schematically illustrated in FIG. 11A. Each gate includes a plurality of input diodes connected to a common terminal 124 and a negative potential source 125 for controlling the application of input signals to a common emitter transistor inverting amplifier stage including a transistor 123. If all input terminals are at ground, this transistor is biased in a nonconducting condition by means of the positive potential source 126 which is connected to the base electrode thereof. Consequently, a negative voltage signal corresponding to the negative potential source 127 appears at the output terminal 128 of the NOR gate. If the input signal at any of the three input terminals 129, 130, or 131 is biased to a negative potential while the others are at ground, no change in status occurs.

If all input terminals 129-131 are negative, terminal 124 is negative. A resistor 126A connecting the transistor base electrode to the terminal 124 is very small, and transistor 123 conducts to produce a ground output at terminal 128. Thereafter, if any of the input terminals is biased to a ground condition, the transistor 123 is biased to a non-conducting condition and produces a negative output voltage at terminal 128. Thus, the positive diode NOR gate can be either an OR circuit for ground level inputs or an AND circuit for negative level inputs with an inherent inversion of signal polarity.

Figure 11A:
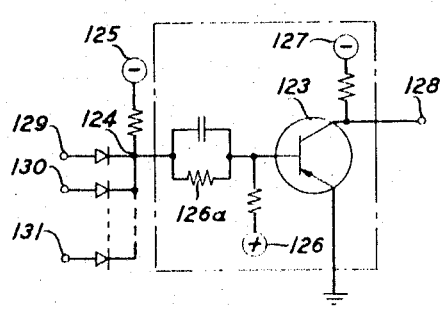
FIGS. 11A and 12A illustrate schematic circuit diagrams of certain circuit logic blocks utilized in building up the circuits of FIGS. 6 through 10, and FIGS. 11B, 11C, and 12B are schematic representations thereof.

Various numbers of input terminals can be employed for the gate in FIG. 11A, and if only a single input circuit is utilized the gate becomes simply an inverting stage. The polarities of the input diodes may be reversed to convert the circuit into a negative diode NOR gate in which case it functions as an OR for negative input signals and an AND logic circuit for positive, or ground, input signals. In that event, the source 125 is eliminated. FIG. 11C includes the schematic representation utilized herein for gates of this type, and in the gate the letter N together with a polarity sign indicates that the representation is that of a NOR gate with the input diodes polarized either positively or negatively as indicated by the polraity sign. Although a negative potential source 127 is included in the schematic circuit in FIG. 11A, it is ot be understood that these NOR gates, as is known in the art, can be arranged so that plural gates operating either in tandem or with parallel output connections can share a single negative potential source.

Figure 11B:
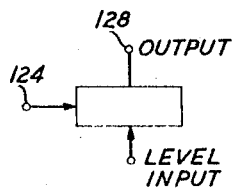
Figure 11C:
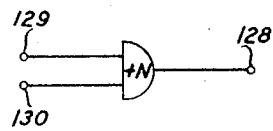

FIG. 11B shows the schematic representation of the inverting amplifier including transistor 123, which was described in FIG. 11A. In this case the lower terminal corresponds to the emitter electrode of transistor 123 and the other input terminal 124 corresponds to the same terminal in FIG. 11A. The output terminal 128 corresponds to the collector electrode of the transistor.

The output of the positive diode NOR gates 119 and 120 in countdown circuit 181 is utilized for a number of different purposes. One part of such output on lead 121, which output is also designated herein the "symbol clock" is coupled back to the aperture generator 57. It is there utilized cooperatively with the input on lead 106 to control the operation of monopulser 113 to produce the second output from the generator on lead 108. This second output is a 2400-cycle train of pulses, herein designated "aperture pulses," which have a duration that is advantageously slightly larger than the desired duration of the eye of the data wave under good transmission conditions. It can be seen in FIG. 24 that the aperture pulse is centered on the negative-going transition of such wave.

Aperture generator 57 also produces spike pulses on lead 109 in the output of monopulser 112. Each pulse on lead 109 occurs at the trailing edge of each of the pulses on lead 107, i.e., at transition times of symbol clock wave 121, and is utilized to inhibit the application of counting pulses to the reversible counter 50 during intervals when such counter is in the process of reversing its direction of operation. This latter signal takes into account the fact that any change in the counter results in the movement, i.e., ripple, of operation signals through the counter through the required number of stages. A finite ripple time is required for such action in response to each input pulse. Therefore, spike pulses on lead 109 inhibit the application to counter 50 of any data signal transition pulses which appear at a time when such transition pulses could initiate a counter ripple when the counter is reversing its direction of operation. A counter reversal during a ripple confuses the operation results.

The durations of the output pulses from generator 57 on the circuits 107 and 108 are, of course, dependent upon data bit rate. The circuits of generator 57 are, therefore, arranged to be automatically altered to accommodate different data bit rates at the time that the data transmission system is set up to accommodate a particular data bit rate. The apparatus for this adjustment advantageously includes relay arrangements, not shown, for switching impedance networks in monopulser circuit time-constant controlling impedances.

The 2400-c.p.s. symbol clock square wave on leads 121 and 122 is utilized to control the operation of a counting direction control circuit 132 which provides up-down counting duration control for counter 50. Two additional input connections 133 and 133' to direction control circuit 132 are provided to invert the manner of operation of the control 132 at certain times to be described so that during normal operation it provides the aforementioned up-down control to the counter 50. However, during start-up operation the up-down control is inverted to provide down counting at times when it would otherwise provide up counting control and vice versa. Control circuit 132 includes an amplifier 140 with double-rail input connections 140A and 140B controlled from circuits 121, 122, 133, and 133'. The latter circuits operates four positive-diode NOR gates 136, 137, 138, and 139 to supply control to amplifier 140.

The signals applied to leads 133 and 133' are under the control of a pilot-detected signal from AGC circuit 11. The latter circuit advantageously includes circuits, not shown, to detect a pilot frequency wave at the beginning of the start-up interval of the system and causes a direct-current control signal to be coupled to a lead 141 in FIG. 8. The control signal is maintained throughout normal system operation in a well known manner. As soon as input steady carrier and pilot signals are received this detected pilot signal actuates a timing circuit 142 in FIG. 8 to operate a relay 143. Timing circuit 142 can be of any form known in the art to cause relay 143 to drop out a predetermined time later as shown in FIG. 25.

In normal operation the relay 143 picks up at the beginning of the reception of steady carrier as shown in FIG. 25, and it drops out just prior to the time for the reception of a data signal. Lead 133 normally has a negative potential applied thereto from a negative source 146 to implement the normal operation of direction control 132 by enabling gates 137 and 139 therein to couple leads 121 and 122 to inputs 140B and 140A, respectively, of amplifier 140. This same negative potential is also used in the Gear Shift Channel of the symbol phase recovery circuit 16 as will be described. Upon the operation of the relay 143 a set of normally open contacts 143A of that relay are closed and thereby ground the lead 133 to disable gates 137 and 139. At the same time a set of normally closed contacts 143B for the relay are opened to remove the normal disabling ground from lead 133' and gates 136 and 138 and leave that lead in a floating condition. It can be seen from FIG. 11A that the floating condition enables the NOR gates 136 and 138 to switch the connections for leads 121 and 122. The change of the conditions of leads 133 and 133' thus reverses the mode of operation of direction control 132.

Figure 27:
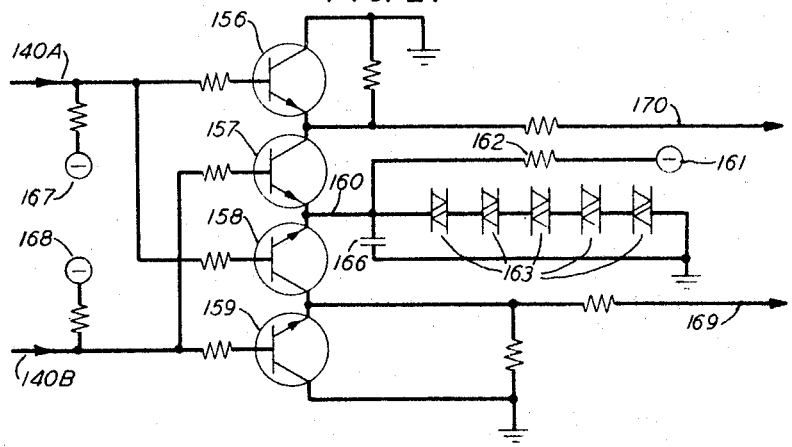

The amplifier 140 is of somewhat different type than those hereinafter considered, and it is illustrated in schematic detail in FIG. 27. It is necessary for this amplifier to operate on a double-rail logic basis in order to control the reversible counter 50 as is well known in the art. Furthermore, it is well known that the direction control gates of such a counter are large in number and require a substantial total current from the amplifier 140 to provide reliable operation. Accordingly, the input leads 140A and 140B of the amplifier 140 are, in FIG. 27, coupled to the base electrodes of four transistors 156, 157, 158, and 159. The collector-emitter circuits of all four transistors are connected in series. The transistors 156 and 157 have their emitter electrodes poled for forward conduction from ground toward a common emitter terminal 160, and the transistors 158 and 159 are poled for forward conduction from ground to the same terminal 160. A potential divider including a negative potential source 161, a resistor 162, and a group of varistors 163 provides a relatively small negative bias at the terminal 160. A bypass capacitor 166 simply keeps signal currents out of the source 160. Two negative potential sources 167 and 168 are coupled to the input leads 140A and 140B and provide normal turn-off bias for the four transistors 156 through 159, as well as providing operating currents for the NOR gates 136 through 139 in the direction control circuit 132.

The leads 140A and 140B carry signals which are the complements of one another. Accordingly, a ground input signal on the lead 140A is accompanied by a negative signal on lead 140B. The negative signal on lead 140B is coupled to the base electrodes of transistors 157 and 159 but does not affect their operation since they are already biased to a nonconducting condition by the source 168. However, the ground signal on lead 140 provides conduction-enabling bias for the transistors 156 and 158. Since transistor 158 has its emitter electrode at a negative potential, it is driven into conduction and thereby provides a negative potential output signal on the amplifier output lead 169 to the counter 50. The transistor 156, however, has its base electrode at ground and holds its emitter electrode at or very near ground. Consequently, it leaves the other amplifier output lead 170 at approximately ground potential. An inversion of the input signals on leads 140A and 140B causes the transistors 156 and 158 to be held in a nonconducting condition while transistor 157 is biased into conduction and transistor 159 is biased on the threshold of conduction. In that state transistor 159 tends to clamp its emitter electrode at ground if any spurious signals on lead 169 should have a negative potential and tend to draw the transistor into heavy conduction. Thus, it is seen that the output leads 169 and 170 to the counter 50 provide a double-rail logic direction control signal which is either ground or negative on each lead in a complementing fashion as between the two leads.

Figure 8:
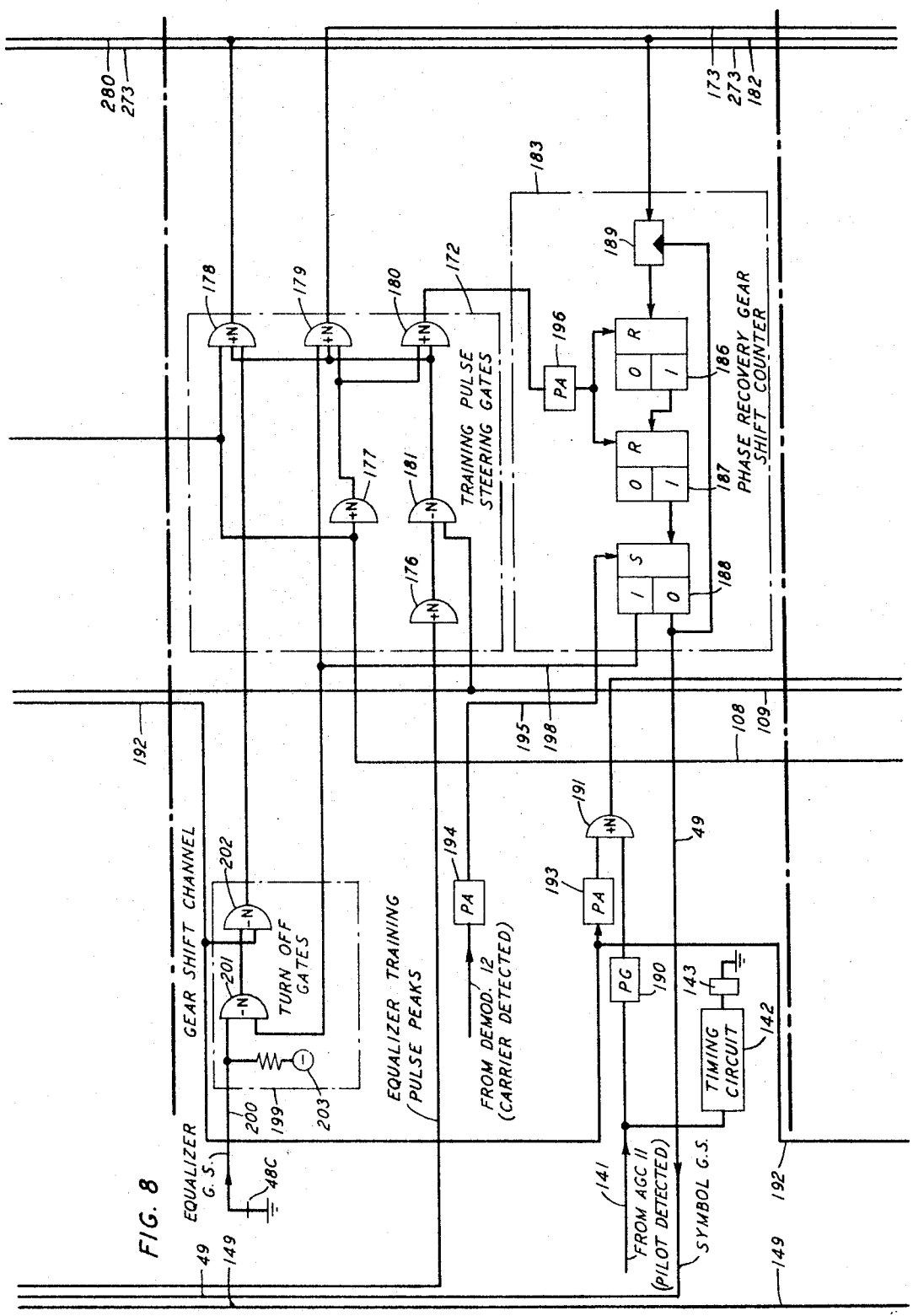
Figure 9:
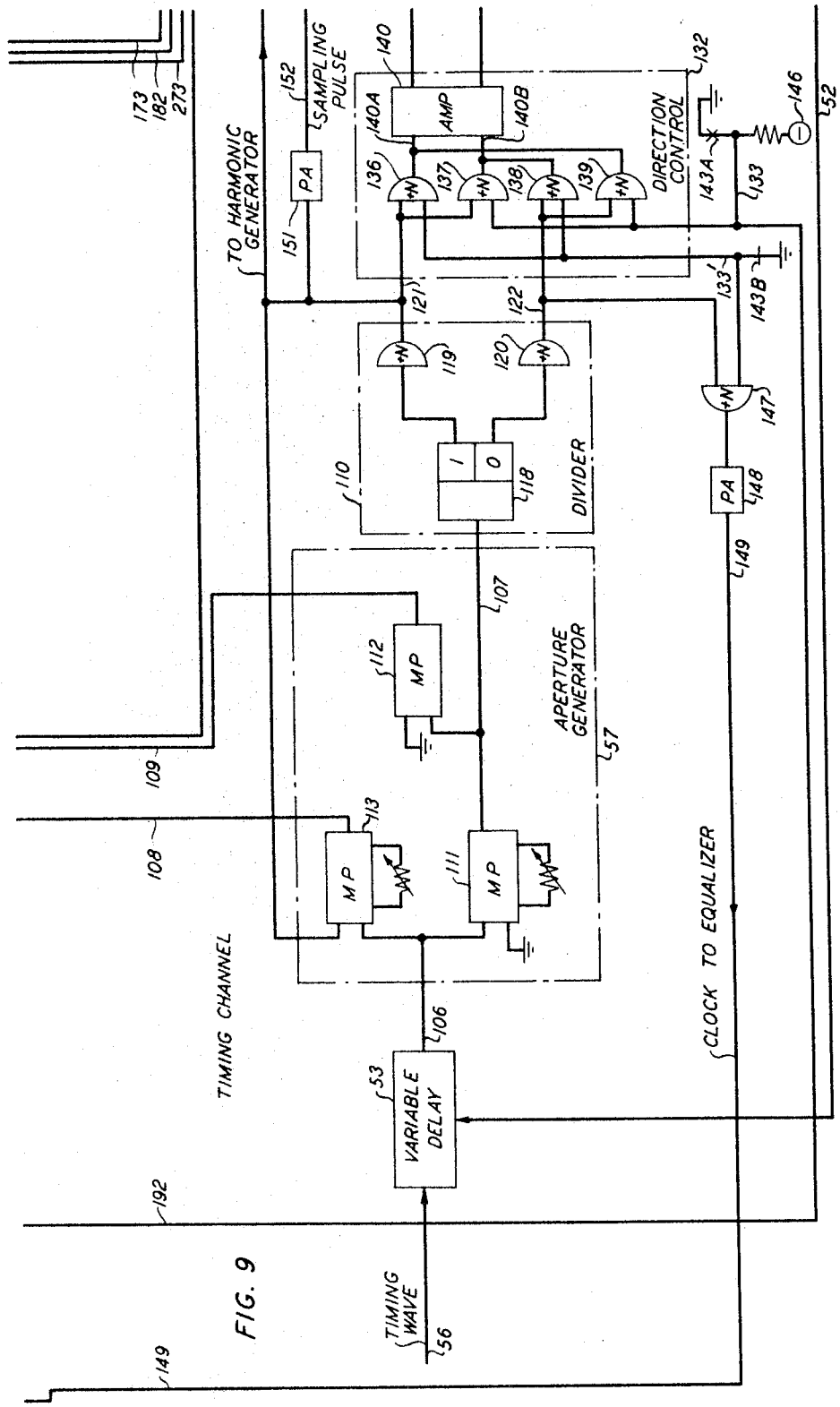

The 2400-c.p.s. symbol clock square wave on lead 121 is further coupled through a positive NOR gate 147 to the input of a pulse amplifier 148. When contacts 143B open, gate 147 is enabled to couple the 2400-c.p.s. symbol clock signals to a lead 149 which provides operating input signal to the coincidence gate 32 in the equalizer of FIG. 6. This provides the clocking frequency for the equalizer as previously outlined. Equalizer 17 does not yet begin significant operation because its pulse detector 30 is not repeatedly operated during steady carrier signal. Equalizer clocking occurs when the relay 143 in FIG. 8 is operated to close contacts 143C in FIG. 6 and after the period of steady carrier has ended and equalizer training pulses have begun to arrive.

Pulse amplifier 148 is advantageously any of the amplifiers known in the art for receiving an input pulse of selectable polarity and of predetermined minimum amplitude and duration and maximum rise time, i.e., a pulse such as is provided by NOR gate 147. The amplifier output likewise has selectable polarity and appropriate configuration to operate other logic gates. This amplifier advantageously includes a monopulser followed by an amplifier to perform pulse width standardization and power amplification.

Another pulse amplifier 151 receives the symbol clock wave from lead 121 and produces a train of negative-going sampling impulses on a lead 152. These latter impulses are supplied to the symbol detecting and decoding circuit 18 for controlling gating functions.

The 2400-c.p.s. symbol clock signal on the lead 121 is also utilized to drive a harmonic generator 153 in FIG. 10 for producing bit rate signals for bit synchronization in the circuits 18. These latter signals advantageously occur at 9600 cycles per second in the illustrated embodiment and are utilized also by the subscriber receiving demodulated and decoded data.

SYMBOL PHASE RECOVERY CIRCUIT— GEAR SHIFT CHANNEL

The circuits of the Gear Shift Channel in the symbol phase recovery circuits 16 make it possible for such recovery circuit and the equalizer 17 to converse back and forth with one another during the receiver terminal start-up operation. This causes the initialization of the equalizer and the initial phase pull-in in the recovery circuits 16 to be accomplished in a rapid, cooperative manner. If this cooperation were not provided, the initial phase pull-in on the timing wave frequency could be erroneous, but more importantly, the equalizer initialization would be likely to be incorrect. The shift register 37 of the equalizer 17 is advanced in a very precise manner in response to the same timing wave function that is to be used for the data detecting and decoding operation. Therefore, if the equalizer were initialized on a recovered timing signal wave that was not in the correct phase relationship with respect to the date, the entire equalizer function would be incorrect and gross error could be injected into the data as a result.

At the beginning of the start-up operation the interval of steady carrier causes a pulse train at a frequency of 4800 cycles per second to be applied on the circuit 56 to Timing Channel of the symbol phase recovery circuit 16, as has been previously described. During that time the relay 143 is in its operated condition, and the pulse amplifier 148 and its gate 147 are enabled. The flip-flop 31 in FIG. 6 is set by the initial appearance of the steady carrier. Clocking signal is supplied from amplifier 148 on the circuit 149 to the equalizer. The indexing counter 36 of the equalizer is initially operated through one cycle by the clocking pulses from lead 149, and its spillover pulse resets flip-flop 31. The latter flip-flop is not thereafter set again during steady carrier training signal because only the initial appearance thereof was able to trigger detector 30. This initial operation supplies a single drive pulse to each of the attenuator counters 29 but does not yet affect any of the stages 46 or 47 so no change takes place in the equalization.

At the end of the interval of steady carrier, the standard training impulses are applied to the receiving terminal as already described. These impulses actuate detector 30 and set flip-flop 31, and they are also coupled through the equalizer. However, initially they receive no equalization because attenuator counters 29 had been reset to zero by the pilot-detected signal on lead 24, and an insufficient number of the standard equalizer training pulses have been received to overcome the integrating effect of the counter stages 43. The received training pulses appear in the output of the summer 28 and are applied through a pulse peak detector 171 to an input of a set of gating circuits 172 in FIG. 8. The circuits 172 are the training pulse steering gates, and they are arranged to steer such pulses to different input connections of the reversible counter 50 in response to different conditions of the equalizer 17. Gates 172 also respond to the phase relationship between the training pulse peaks and the aperture pulses.

The gates 172 include five positive diode NOR gates 176 through 180 and a negative diode NOR gate 181. Each positive-going equalizer training pulse peak actuates gate 176 to supply a negative pulse to the negative NOR gate 181. When the latter gate is not inhibited by a negative signal on the inhibit lead 109 from aperture generator 57, it couples the equalizer pulse peak as a negative pulse to the inputs of all three of the gates 178 through 180. Negative aperture pulses on the lead 108 are coupled through the positive diode NOR gate 177 as positive pulses. During this aperture pulse condition, the gates 179 and 180 are disabled for the operation by the equalizer pulse peaks. However, at all other times the gates 179 and 180 are enabled by the negative output from the gate 177. The negative aperture pulses are also coupled to the positive diode NOR gate 178 and enable that gate for each equalizer pulse which is within the aperture. The output of gate 178 is applied on a lead 182 to the input of a phase recovery gear shift counter 183.

Initially the gates 172 couple pulses corresponding to the peaks of the equalizer training pulses to counter 50 on a circuit 173, assuming, of course, that such pulses are outside of the aperture so that the output of gate 177 enables gate 179. The circuit 173 drives only the five most significant stages of the counter 50 so that it causes counter operation in large steps in the direction dictated by direction control 132. The direction of counter operation indicated by control 132 changes at a rate of 4800 times per second, i.e., in response to each transition of the 2400-c.p.s. signal on lead 121. Thus during one half cycle of the signal on lead 121 the counter counts up and during the next half cycle it counts down, if during each of those half cycles it is provided with drive pulses at some input connection.

The training pulse peaks are applied to gates 172 at a rate which is much lower than the symbol rate, e.g., one every 32nd symbol. Counter 50 operates in response to such pulses in large steps to shift the phase of the timing wave toward phase coincidence with the training pulse peaks. The timing wave phase is shifted to bring the aperture pulses toward phase coincidence with the peaks of the training pulses. Incorrect phase lockup about the positive-going transitions of the symbol clock wave on lead 121 is avoided because the signals on leads 108 and 121 have a fixed relationship to each other and the counter direction is fixed with respect to the symbol clock polarity.

The aperture pulses on lead 108 enable the gate 178 in steering gates 172 so that any training pulse peaks which occur during an aperture pulse are steered onto the circuit 182 instead of the circuit 173. The circuit 182 applies such pulses to a less significant input of counter 50. Pulses on circuit 182 drive the ten most significant stages of counter 50 for operating that counter in finer steps than do pulses on lead 173. Consequently the least significant of those ten stages has no direct output to converter 51 to help integrate out minor signal perturbations. Circuit 182 also applies such pulses to the phase recovery gear shift counter 183.

The gear shift counter 183 includes three conventional flip-flop circuits, 186, 187, and 188 connected in a binary counting circuit arrangement. Each of the flip-flop circuits has a complementing type of input connection such that each input pulse thereto triggers the flip-flop circuit. In addition, each such circuit has separate binary ONE and ZERO output connections. Each of the flip-flops also may be selectively operated to either its set or its reset condition by means of a separate lead directed to an input portion of the schematic representation containing either an S or an R, respectively, in a manner well known in the art. An input inverting circuit 189 of the type shown in FIG. 11B is utilized to couple the pulses from lead 182 to the binary counter in gear shift counter 183. The circuit 189 is controlled by the binary ZERO output of the flip-flop stage 188 so that the input to the counter is disabled upon the resetting of the flip-flop stage 188.

At the beginning of the start-up operation the pilot-detected signal from automatic gain control circuit 11 in FIG. 1 is coupled through a pulse generator 190 which may be any conventional type of pulse generator such as, for example, the known Schmitt trigger type of circuit. This pulse generator responds to a negative-going input signal and produces an output pulse of known duration suitable for operating gates, flip-flops, and other logic-circuits. This output pulse is coupled to one input of a positive diode NOR gate 191. Also at the beginning of the start-up operation, the relay 143 is operated as hereinbefore mentioned and the resulting ground signal on lead 133 is coupled through a lead 192 and a pulse amplifier 193 which is, for example, of the same type as the pulse amplifier 148 in FIG. 9, to another input of the gate 191. The coincidence of these two input signals actuates the gate 191 and causes it to produce an output pulse which resets the reversible counter 50 in FIG. 10 to a counting level which is approximately midway in the range of operation of such counter.

Also during the start-up operation, but at the end of the interval of steady carrier, it is necessary to set the flip-flop circuit 188. A variety of techniques are known in the art for accomplishing this result. One method advantageously employed is to detect the end of the steady carrier in the output of the demodulator 12 of FIG. 1 and this method is shown in the aforementioned Becker transmission system application. Such a signal is coupled by a pulse amplifier 194 in FIG. 8 to a lead 195 and sets the flip-flop circuit 188. At this time the binary ONE output of flip-flop 188 on lead 198 enables gate 179, and it also enables gate 178 via turn-off gates 199 as will be described.

The setting of flip-flop circuit 188 produces a ground level signal which is coupled by the feedback connection of the counter to enable the input inverting circuit 189. Now each equalizer pulse peak which is coupled from the gate 178 by the circuit 182 through the inverter 189 actuates the flip-flop circuit 186 for driving the gear shift counter. If such a pulse peak which is within the defined aperture is followed by another equalizer training pulse peak, which is not in the aperture, the gate 180 in steering gates 172 produces an output, as hereinbefore described; and that output is coupled through a further pulse amplifier 196 to reset the flip-flop circuits 186 and 187 in the gear shift counter 183. This starts the aperture pulse counting operation once more from the beginning.

When the phase of the timing wave has been brought sufficiently close to the phase of the equalizer training pulse peaks so that such peaks are regularly occurring within the aperture defined by aperture pulses on circuit 108, the gear shift counter 183 is able to count four successive such training pulses within aperture pulses. The counting of the fourth such pulse in the embodiment illustrated in FIG. 8 produces an output signal from the binary ONE output of flip-flop circuit 187 which resets the flip-flop circuit 188 thereby disabling the inverter circuit 189 in the counter input. It will be noted that this same operation which caused the flip-flop circuit 188 to be reset also placed the first two stages of the counter in their full count, or reset, condition; and they are ready for a new initialization procedure when such should be called for. No further special resetting signal is required for the circuits 186 and 187.

The resetting of flip-flop circuit 188 also causes an output gear shift signal to be supplied on the circuit 49 to actuate the relay 48 in the equalizer 17 of FIG. 6. At this time the binary ONE output of flip-flop 188, which is coupled by a lead 198 to disable gate 179 and prevent the application of any further training pulses to lead 173. The signal on lead 49 tells the equalizer that the symbol phase recovery circuit has operated in response to the incoming standard training pulses through a range of coarse phase adjustment, and that a coarse phase pull-in has been achieved to an extent such that coarse phase adjustment operation has been discontinued and the phase recovery circuits have shifted into a less coarse adjustment phase of operation. As previously noted, this gear shift signal from the phase recovery circuits operates relay 48 to initiate the operation of equalizer 17 in coarse steps.

As soon as equalizer 17 has completed its initial coarse equalization, the relay 48 drops out as previously noted, and a set of normally closed contacts 48C in a circuit 200 in FIG. 8 are thereby closed to ground that circuit which is connected to an input of turn-off gates 199. The latter gates provide an enabling input to gate 178 to permit the coupling of training pulse peaks to lead 182 until coarse equalization is finished.

Gates 199 include two negative diode NOR gates 201 and 202. The gate 201 is arranged to operate as OR logic for negative signals so that the ONE output of flip-flop circuit 188 prior to the resetting thereof, is coupled through gate 201 as a ground, or positive, signal to enable gate 202. Alternatively, a negative voltage from a source 203 is coupled through gate 201 during equalizer coarse operation to enable gate 202. Since gate 202 is at the time of either of the mentioned positive signals also enabled by the ground on lead 192, its own negative output to gate 178 enables that gate as previously mentioned. However, after flip-flop 188 has been reset at full symbol gear shift count and relay 48 has closed its contacts 48C at the end of coarse equalization gate 201 has all positive inputs; its negative output operates gate 202 to produce a ground disabling output to gate 178. Consequently, no further equalizer pulses reach counter 50 by that gate. Thus, gate 178 is disabled during start-up after both the symbol phase recovery and the equalization coarse steps of adjustment have been completed. Since the circuit 173 had already been previously blocked by the ground signal on lead 198 from counter 183, the counter 50 is completely disabled at this time. However, it resumes its phase adjusting operations subsequently when sufficient data is received, and the manner of this operation in connection with the Data Channel will be hereinafter described.

SYMBOL PHASE RECOVERY CIRCUIT—DATA CHANNEL

A portion 18A of the symbol decision and decoding circuits 18, previously mentioned in connection with FIG. 1, is shown in FIG. 6 and is utilized in cooperation with the symbol phase recovery circuit 16 and the Data Channel therein for controlling timing wave phase during data transmission. The decoding circuits 18A include, for a system which can handle up to sixteen data symbol amplitude levels, three folding rectifier circuits 207, 208, and 209, as well as four slicer circuits 210, 211, 212, and 213. These rectifier and slicer circuits extract from the demodulated and equalized data signal the necessary decoding information relating to magnitude of signal amplitude as well as polarity thereof at the sampling times. The rectifiers and slicers also provide to the symbol phase recovery circuits 16 indications of the times at which any signal transition passes through any of the plural signal slicing levels which are utilized to discriminate among the various information-determinate signal amplitude levels. All of the rectifiers are the same and all of the slicers are the same. Schematic diagrams of a rectifier circuit and a slicing circuit are shown in FIGS. 28 and 29, respectively.

The rectifier circuit in FIG. 28 receives input signals from the equalizer 17 or from another rectifier, and these signals are coupled to the base-emitter circuits of two transistors 216 and 217 of complementary conductivity types. The base electrodes of both transistors are connected to ground. In FIG. 28 transistor 216 is shown as an N-P-N transistor and the transistor 217 is shown as a P-N-P transistor. Negative input signals draw the transistor 216 into conduction by virtue of the connection of the collector electrode thereof to a source 218 of positive potential which is coupled through a resistor 219 to such collector electrode. The potential drop developed across resistor 219 biases a transistor 220 into conduction, and the current flow through the emitter-collector circuit of this P-N-P transistor between the positive source 218 and a negative potential source 221 develops a positive-going potential at the collector electrode of transistor 220. The bias circuits for transistor 220 are adapted so that the transistor normally conducts lightly with its collector electrode approximately at ground potential.

Positive input signals to the rectifier circuit in FIG. 28 drive the P-N-P transistor 217 into conduction and bias transistor 216 off. The conduction in transistor 217 causes current to flow through a resistor 222 to the negative potential source 221. Accordingly, a positive-going potential is developed across the resistor 222. Thus, regardless of which of the transistors 216 or 217 is conducting for either negative or positive input signals, a positive-going potential is developed at the terminal 223 which corresponds to the collector electrode of transistor 220. A rheostat 224 is included in the emitter circuit of transistor 220 for adjusting circuit symmetry to provide similar responses for either positive or negative input signals.

A common emitter amplifier including a transistor 226 is arranged with its base electrode connected to the terminal 223 for receiving the aforementioned positive-going potentials representing the full wave rectified input signal. Transistor 226 is normally biased in a conducting condition in the absence of input signals by means of the potential drop developed across a potential divider including a resistor 227 and the resistor 222. Under such conditions the output at the collector electrode of transistor 226 is at its positive-most level.

Transistor 226 is drawn into heavier conduction for linear amplification by the aforementioned rectified positive-going signal excursions to develop at its collector electrode a signal which starts at the mentioned positive potential level and extends in a negative-going fashion as input signals to the base electrode increase. The maximum anticipated positive signal at terminal 223 produces a negative output at the collector electrode of transistor 226. Signals at the collector electrode of transistor 226 are applied to any next succeeding rectifier in the symbol detecting and decoding circuits 18A and they are also applied to one of the aforementioned slicer circuits.

The basic function of the common emitter stage including transistor 226 in the rectifier circuit is to amplify and re-reference the full wave rectified signal at the input to such transistor. The total positive amplitude swings of unrectified input to the rectifier circuit and rectified output from transistor 226 are approximately the same. In addition, the rectified signal at terminal 223 is re-referenced so that the range of its maximum possible swing is approximately symmetrical with respect to a zero voltage axis. A rheostat 228 is included in the emitter circuit of the transistor 226 for making fine adjustments in the level positioning of the output wave.

FIG. 30 includes a family of wave diagrams illustrating the type of operation which characterizes the rectifier circuits 207 through 209. The first waveform is a single signal excursion through the zero voltage axis. This excursion extends between two adjacent symbol sampling intervals and is considered to cross through all of the fifteen signal slicing levels in order to illustrate the operation of the rectifier and slicer circuits herein presented. The output of rectifier circuit 207 shows that the signal received from the equalizer has been full wave rectified and re-referenced by the circuit of transistor 226 so that it extends in both positive and negative directions once more in its rectified form.

The waveform in the output of rectifier 207 extends approximately equally in the positive and negative directions because it was specified at the outset to be a signal which extended from the extreme negative excursion through the zero voltage axis to the extreme positive-going excursion. The output of the rectifier 207 now crosses the zero voltage axis two times and has the appearance of the equalizer output wave folded in a negative direction along its original zero voltage axis. The ends of the wave do not extend to as large an amplitude as the intermediate peaks because the rectifier output extends between a slice level and an information-determinant level.

In a similar fashion the output of rectifier 207 is by the rectifier 208 again full wave rectified to accomplish a similar folding operation about the new zero voltage axis. The second folded format of the signal wave is again re-referenced as hereinbefore described to provide in the output of rectifier 208 the folded waveform which has four transitions through its new zero voltage axis. The output of rectifier 208 is further applied to rectifier 209 which accomplishes an additional folding and re-referencing operation to produce the thrice folded signal wave in the output which has eight zero axis crossings.

The slicer circuits 210 through 213 receive the signal waves of the types illustrated in FIG. 30 and produce therefrom the corresponding rectangular signal pulses illustrated in FIG. 31. The changes of signal state in slicer outputs occur at the times of input signal axis crossings and those state transitions comprise the transition information used by the symbol phase recovery circuits 16. The amplitude information in the pulses of FIG. 31 is utilized by the decoding circuits. Each slicer circuit includes, as shown in FIG. 29, a differential amplifier having two amplification transistors 229 and 230 which are normally biased in the absence of input signals for substantially equal conduction in each transistor. Input signals are received via a resistor 231 either from the equalizer 17 or from one of the rectifiers, and such input signals are of the format illustrated in FIG. 30.

A further transistor 232 has its base-emitter circuit connected in series with a resistor 233 between the collector electrodes of the transistors 229 and 230. Thus, if the latter two transistors are conducting approximately equally, the potentials appearing at their respective collector electrodes are also approximately equal, and the transistor 232 does not conduct. If transistor 229 should respond to a positive-going input signal and conduct more heavily than does the transistor 230, the potential difference presented to the transistor 232 is negative and the latter transistor remains nonconducting. However, a negative-going input signal tends to reduce the conduction in transistor 229 with the well known feedback effects which increase conduction in transistor 230, and the resulting shift in the potentials at the collector electrodes of transistors 229 and 230 drive transistor 232 into conduction. Emitter-collector current for transistor 232 is supplied from the positive potential source 236 and a negative potential source 237.

Conduction in transistor 232 produces a positive-going signal which is coupled to the base and collector electrodes of a further transistor 238 through saturation-preventing diodes 239 and 240. Transistor 238 is normally nonconducting and is arranged in a common emitter configuration. A positive-going signal excursion at the collector electrode of transistor 232 biases the transistor 238 into conduction and produces a negative-going potential at the collector electrode thereof. This latter potential biases a further transistor 241 into conduction to produce a positive-going ground output signal in response to the negative-going input signal applied through the series resistor 231 to the slicer circuit.

The corresponding outputs from each of the slicers 210 through 213, when taken together, comprise the Gray coded form of the multilevel information supplied from equalizer 17. Those outputs are individually coupled by input connections, not shown, to the symbol decision and decoding circuits 18.

The four outputs from the four slicers 210 through 213 are also individually coupled by circuits 241, 242, 243, and 246 to the separate input connections of a slicer output selection circuit 247. In a given system a reduction in bit rate of data transmission can usually be accompanied by a reduction in the number of bits required to represent a character. Consequently, the number of signal levels needed in level coded transmission is reduced and the number of signal slicers required is also reduced. The circuit 247 permits slicers to be selected as may be appropriate for different bit rates of data transmission to a subscriber station.

Figure 7:
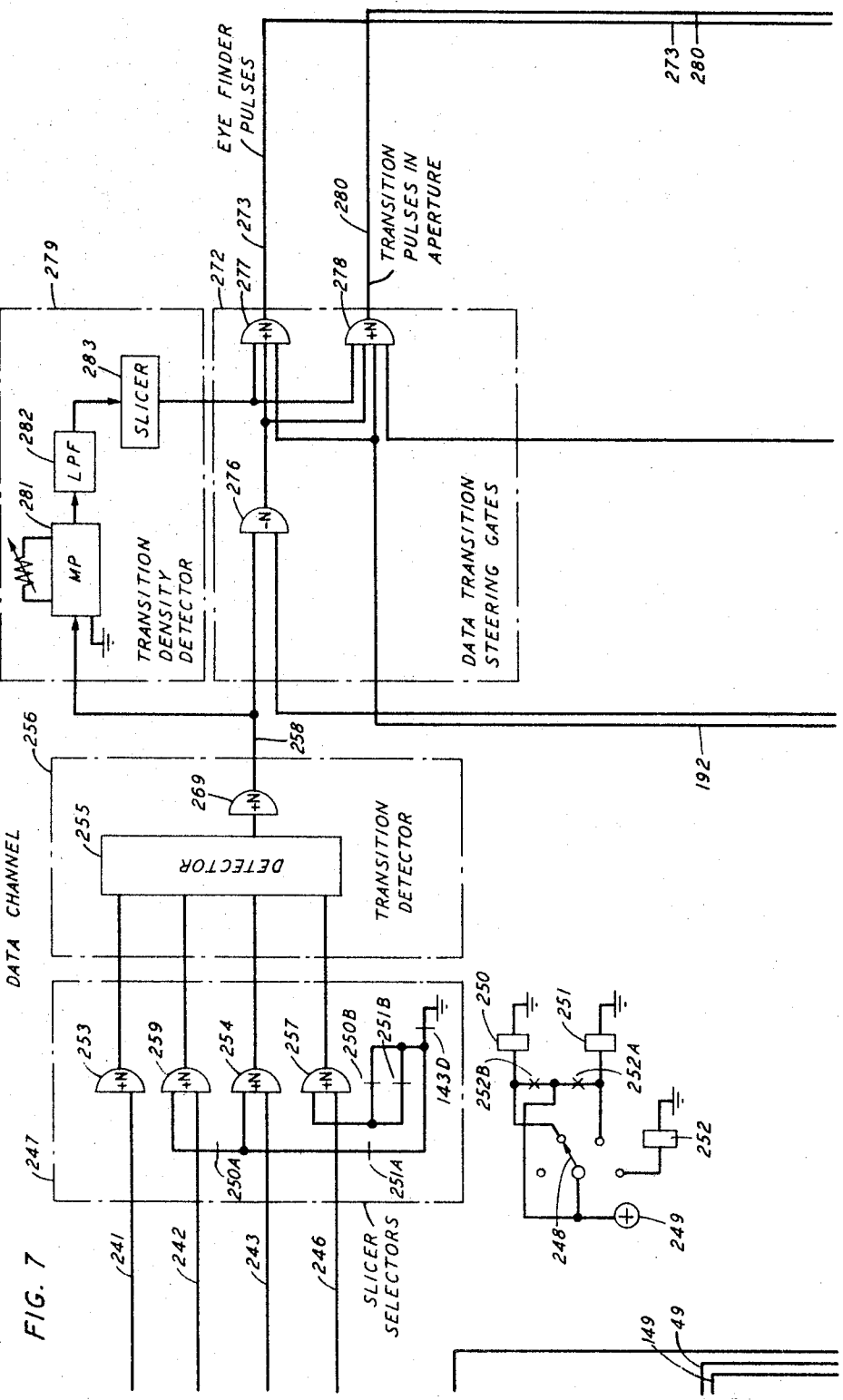

In FIG. 7 a selector switch 248 couples a positive potential source 249 to different circuits to select different bit rates. In three of the illustrated circuits relays are included with contacts for selecting slicers. Either of two relays 250 and 251 may be actuated by switch 248, or the switch may energize a third relay 252 which in turn energizes both of the relays 250 and 251 through its contacts 252A and B. The slicer selection is made after relay 143 has dropped out near the end of the interval of equalizer training pulses. At that time contacts 143D in circuit 247 are closed and ground is available to the inputs of the selection gates.

If the binary bit rate were only 2400 bits per second, no relays are operated and the output of slicer 210 on lead 241 is coupled through gate 253 to a transition detecting circuit 256. No other slicer outputs are utilized. However, as the bit rate is stepped up in increments of 2400 bits per second, an additional slicer is utilized at each level until at the 9600 bits per second transmission rate all four slicers are being used at the same time. At 4800 bits per second relay 250 is operated, and its contacts 250A enable a gate 259 so that slicers 210 and 211 are working together. At 7200 bits per second relay 251 is operated and its contacts 251A enable gates 259 and 254 so that all slicers except 213 are operating. At 9600 bits per second relays 250 and 251 are operated by relay 252 to add gate 257 and its slicer 213. Additional connections are also advantageously included, but not shown, for altering the time constants of monopulsers, such as those in the aperture generator 57, which produce pulses that must have durations corresponding to eye opening duration. The duration of the eye opening changes whenever a change is made in the bit rate. Thus, the selection of appropriate pulse generator time constants and data bit rates can all be accomplished in one operation.

The output of selection circuit 247 is applied to a transition detector 256 including a detector 255 and a gate 269. In detector 255 each of the slicer outputs is differentiated and the differentiated signals are then full wave rectified and OR'd into a common pulse regenerating amplifier for sharpening the pulse configuration. The aforementioned detector 255 is shown in detail in FIG. 32. Each of the selecting gates 253, 257, 254, and 259 drives a different detecting amplifier 260, one of which is shown in detail. The circuit 260 includes a transistor 261 normally biased nonconducting by a positive source 262. The negative-going slicer output pulses in FIG. 31 are inverted in the gates of circuit 247, but they still are either negative level or ground. A negative input to circuit 260 drives a transistor 261 into conduction, and a differentiating pulse transformer 263 in its collector circuit produces an impulse on each input signal transition. Diodes 266 and 267 couple the leading and trailing edge differentiated impulses to the input of the common amplifier 268 which is of the same type as the amplifier 260. The latter amplifier supplies negative output pulses to the gate 269 in FIG. 7, and that gate puts corresponding positive pulses on lead 258.

The output of gate 269 is a train of positive pulses on lead 258 wherein each pulse corresponds to a signal wave transition in the output of one of the slicers and thus corresponds to a transition of the data symbol signal through one of the predetermined slicing levels for the multilevel data signal. The pulses do have a characteristic distribution which is partially indicated in FIG. 24. There are no transition pulses in the time intervals corresponding to the central portion of the data eye pattern.

Figure 13:
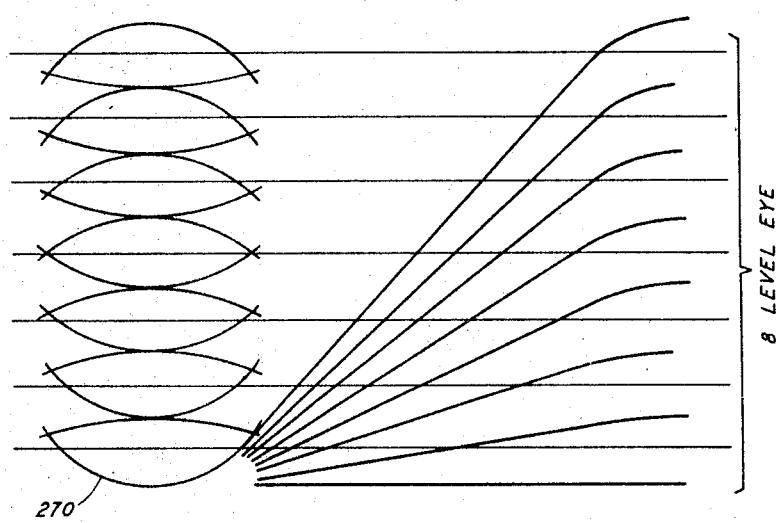
Figure 14:
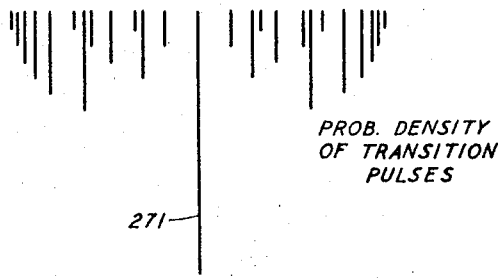

Another characteristic of the transition pulse train appearing on lead 258 is considered in connection with FIGS. 13 and 14. FIG. 13 illustrates a portion of an eight-level data eye pattern. Only eight levels are illustrated in order to have a practical scale which is large enough to indicate what is taking place. Similarly, only a limited number of traces are indicated for the same reason. Two traces are shown to define each of the seven eyes in the eye pattern of the eight-level data signal. The lowest horizontal line is a data signal trace with no transition, but the other seven horizontal lines in FIG. 13 represent the seven slicing levels for the eight-level data signal. The bottom-most eye-defining trace 270 in FIG. 13 is shown as branching out into eight different branches at the right hand side of the figure. These eight branches indicate that the signal traces illustrated as defining each eye may go, in the next symbol interval, to the same signal level or any one of the remaining seven signal levels. However, a trace which goes from one information-determinant signal level to another must cross at least one signal slicing level and thereby produce a pulse in the train on lead 258, which is illustrated in FIG. 24. Furthermore, any signal trace which in passing from one information-determinant level to another between successive eyes, and which in the process crosses an odd number of slicing levels, must of necessity cross one of those slicing levels at a time point which is approximately midway between the two successive data symbol sampling times. This fact becomes more apparent upon a consideration of FIG. 14 which represents a long-time probability density distribution of transition pulses between successive eyes of a data eye pattern.

It is seen in FIG. 14 that there is no likelihood of data transitions at the center of the eye. The probability of transitions occurring is maximum midway between two successive eyes; and it decreases and then increases again as the edge of the eye is approached. As shown, the envelope of the distribution of the transition pulse probability has an extremely large peak 271 at the time center corresponding to the aforementioned fact that signals crossing an odd number of slicing levels must cross a slicing level approximately midway between data eyes. On the average equal numbers of transitions occur on each side of the peak 271. This transition distribution characteristic is utilized in accordance with the invention for controlling the phase relationship of the sampling pulses to achieve an optimum relationship with respect to the data signal and the eye patterns thereof. For this purpose, a further set of steering gates 272 is employed in FIG. 7 for steering data transition pulses on the lead 258 to predetermined input connections of the reversible counter 50 which controls the recovered carrier phase for symbol decoding and detecting purposes.

Steering gates 272 include a negative NOR gate 276 and two positive NOR gates 277 and 278. Each positive transition pulse from circuit 258 operates gate 276 except for those pulses occurring during an inhibition pulse from lead 109. Negative output pulses from gate 276 are applied to both gates 277 and 278 which are further enabled after the training interval by a negative signal from the lead 192. The gate 278 is disabled by the signal on the aperture pulse lead 108 except during aperture pulses. Still another enabling signal for gates 277 and 278 is provided by a transition density detector 279, to be described.

The gates 272 couple all transition pulses through gate 277 to a circuit 273 which applies such pulses, now positive, to the input connection of the least significant stage of the counter 50 for driving that counter in the direction indicated by the output signals from direction control circuits 132. The pulses on lead 273 are called "eye finder" pulses. In addition, transition pulses that occur in coincidence with aperture pulses are said to be "in the aperture" and are applied through gate 278 to a lead 280 and that lead is coupled to lead 182 in the Gear Shift Channel to drive counter 50 at its intermediate rate.

Transition density detector circuits 279 also receive the transition pulses on lead 258 for producing an output control signal which is applied to the gates 272 for enabling the gates 277 and 278 at any time when the rate of appearance of transition pulses is adequate to assure reliable phase adjustment. The detector 279 advantageously includes a monopulser 281 triggered by the transition pulses and having a time constant which is less than minimum possible interval between transition pulses but which is advantageously adjusted when the data rate is changed as hereinbefore mentioned. The output of the monopulser is coupled through a low-pass filter 282 and a slicer 283. The slicer has a threshold level which is set to correspond to the minimum acceptable amplitude of low-pass filter 282 output for the minimum reliable data transition rate previously mentioned. If the slicer is actuated, its output enables the steering gates 272 to operate as hereinbefore described. However, if the transition rate falls to a low level, the slicer remains inoperative, and the enabling signal for the gates is removed, thereby preventing operation of counter 50 in response to data signal transition pulses. The threshold is advantageously set so that gates 272 will be disabled during intervals of steady carrier and equalizer training impulses at start-up time.

Figures 32, 33:
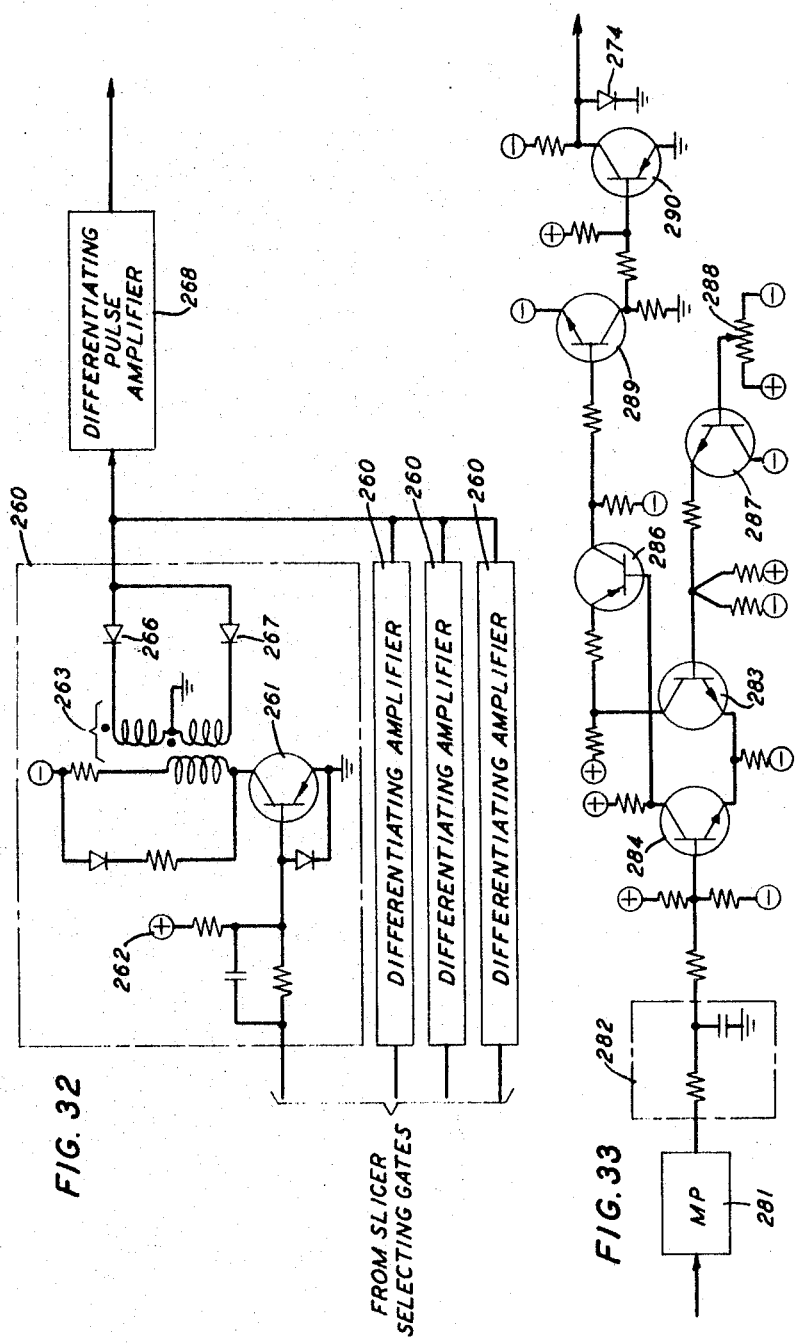

FIG. 33 includes schematic detail of a circuit that was advantageously employed for the slicer 282. Three transistors 284, 283, and 286 are arranged in a differential amplifier threshold circuit similar to that of the slicer in FIG. 29. An additional transistor 287 is biased to be normally conducting in a linear part of its operating range to provide adjustable base electrode bias for transistor 283. Conduction level in transistor 287 is changed by means of the tap on a base circuit potential divider 288. This adjustment permits the threshold to be varied while the effect thereof on output data error rate is determined so that a transition rate providing reliable phase information for a desired error rate may also be determined. This threshold will, of course, be some place on the rolloff characteristic of filter 282 so that an upper frequency cutoff is thereby fixed sharply.

During normal operation transistors 284, 283 and 287 are conducting, and transistor 284 conducts less heavily than transistor 283 in response to a strong negative signal from filter 282. Transistor 286 is off and provides sufficient bias to hold a further common-emitter-connected transistor 289 off as long as there are ample input transitions present. The ground output of the latter stage is unable to bias another common-emitter-connected transistor 290 into conduction, and the negative enabling signal for gates 272 appears at its collector electrode. A reverse breakdown diode 247 limits the magnitude of the enabling signal. If too few transitions are received, transistor 284 conducts more heavily, and transistor 286 is biased on. The positive-going signal at its collector electrode biases transistor 289 on and its output biases transistor 290 into hard conduction. The ground then at the collector of transistor 290 disables gates 272.

Figure 15:
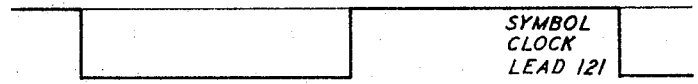

FIG. 15 illustrates the symbol clock waveform on lead 121 and shown in enlarged time scale compared to that shown in FIG. 24. In FIG. 15, the enlarged time scale corresponds to the scale of the eye pattern of FIG. 13. It can be seen that the negative-going transitions of the symbol clock wave occur in the centers of the eye, and the positive-going transition coincides with the peak 271 of the transition pulse distribution density characteristic. Since transition pulses are equally distributed on each side of peak line 271, counter 50 counts up and down between eyes, but its average count does not change as long as distribution balance is held. However, if the symbol clock wave of FIG. 15 should be shifted either to the right or to the left with relation to the data signal wave, the number of data wave transitions which are likely to occur in any given half cycle of the symbol clock wave shifts. Instead of the number of transitions being approximately equal in each half cycle as would be the case for the desired phase relationship there are more transitions in the positive symbol clock half cycle interval for a leading symbol clock phase; and, conversely, there will be more data symbol transitions in the negative half cycle interval of the symbol clock for a lagging symbol clock phase relationship with respect to the data eye pattern of FIG. 13.

Assume that direction control 132 is adapted to drive counter 50 up to correct a leading phase and that a timing leading phase condition exists. The counter will receive more drive pulses from the lead 273 during the positive half cycle of the symbol clock wave on lead 121 than it receives during a negative half cycle. Consequently, it will during the positive half cycle count up by more steps than it counts down during the negative half cycle with result that the digital-to-analog converter 51 will provide a direct current signal which is more positive to the variable delay 53. Delay 53 responds by injecting more delay in the timing wave and thereby bringing the symbol clock phase toward coincidence with the data phase. Conversely, the direction control circuit 132 would for a lagging phase relationship cause the counter 172 to have a net down counting operation in response to transition pulses from circuit 273 for any given symbol interval. The delay in circuit 53 is thereby reduced and the symbol clock phase is advanced to bring it into proper phase relationship with respect to the data eye pattern. Thus, in this type of operation, the symbol clock wave and data transitions are utilized to "find" the data eye with the negative-going symbol clock transitions. This can be seen from a comparison of the wave diagrams of FIG. 15 for the symbol clock and FIG. 14 for the sampling pulses with reference to the corresponding diagrams for the waveforms on leads 121 and 194 in FIG. 24.

Figure 16:

In reviewing FIGS. 13 through 16, it is apparent that the centering of the sampling pulse of FIG. 16 in the eye of the data wave depends upon the centering of the peak 271 in the distribution envelope at approximately the midpoint between the centers of two adjacent eyes. Such centering in turn depends upon obtaining symmetrical pulse shapes which are rarely obtained except in ideal cases. In the practical data signal wave after equalization there is usually some lingering distortion in the wave. Such distortion, which is illustrated in one form in a further eight-level eye pattern in FIG. 17, causes a shift of the peak 271 of the distribution characteristic from the midpoint between the data eyes. Consequently the previously-described data channel operation forces the negative-going transitions of the symbol clock wave on lead 121 away from the center of the eye. Shifting of the symbol clock also pulls the sampling pulses in FIG. 20 away from the center of the eye and increases the probability of error since the voltage amplitude height of the eye at the new sampling time is considerably smaller and much more closed in upon the signal slicing level for any given eye.

In order to correct the shifted sample situation, the aperture pulses on lead 108 from the aperture generator 57 in the Timing Channel are utilized by the data transition steering gates 272 in accordance with the present invention. The aperture pulses additionally steer data transition pulses to a gate output circuit 280 when such transition pulses fall within the time interval of an aperture pulse. This is shown in FIG. 24 wherein the aperture pulses on lead 108 for an in-phase condition bracket two of the data transition pulses at the beginning and at the end of each eye so that the gates 272 cause two pulses to appear on lead 280 at the beginning of each eye and two pulses at the end of each eye. These same pulses are also steered by the gates 272 to the lead 273, as previously mentioned.

Pulses from lead 280 are coupled to the lead 182 in the output of the training pulse steering gates 172 which, as previously mentioned in connection with the Gear Shift Channel, is applied to the input of the ten most significant stages of counter 50 and bypasses the two least significant stages. Thus, eye finder transition pulses from the gates 272 which are outside of the aperture pulse interval are applied to only the least significant stage of the counter, and pulses that are within the aperture are applied both on the leads 280 and 182 to a more significant stage and on the lead 273. Accordingly, the transition pulses which are within the aperture have a greater influence upon the output from digital-to-analog converter 51 than do the pulses outside the aperture. It can be seen from a comparison of FIGS. 19 and 21 that transition pulses which appear in one half of an aperture pulse in FIG. 21 affect counting operation in one direction, and transition pulses appearing in the other half of the aperture pulse affect counter 50 while it is counting in the opposite direction. This arises from the fact that the aperture pulse is centered on a transition of the symbol clock wave on lead 121 and also from the fact that the direction of operation of counter 50 is reversed in response to each transition in a symbol clock wave 121, as previously described.

When the incorrect phase relationship exists between the symbol clock and the data wave, as shown in FIGS. 17 through 21, the data wave transitions of slicing levels are still approximately equally distributed between the two halves of the symbol clock waveform shown in FIG. 19. However, in the shifted condition illustrated in FIG. 21, the aperture pulse embraces a greater number of transition pulses in the trailing half of such aperture than are included in the beginning half of the aperture pulse. In fact, for a sufficiently large phase angle error there may be no transition pulses in the initial half of the aperture pulse. Since each of the transition pulses which falls within the aperture pulse interval has a much greater weight in the operation of counter 50 than do transition pulses outside of the aperture, counter 50 is forced to more nearly conform to the aperture pulse effect even though the eye finder control is not satisfied.

Relating the discussion of FIG. 19 to the discussion of FIG. 15, the FIG. 19 illustrates a lagging phase relationship of the aperture wave behind the data wave. The transition pulses in the last half of the aperture pulse interval coincide with a negative-going half of the symbol clock wave on lead 121. As indicated in connection with FIG. 15, the counter is operated under such conditions to count down to correct the lagging phase relationship. Thus, even though the eye finder pulses on led 273 have attained a satisfactory phase condition, the aperture transition pulses drive the clock phase back to a point which is approximately centered on the data eye so that there are equal numbers of data transitions in the beginning portion and the ending portion of the aperture wherein the counter is operating in opposite directions. This effect of the aperture pulses overrides the broad, or coarse, centering effect of the symbol clock pulses which were previously described and causes the symbol clock wave to have its negative-going transitions recentered on the data eye in spite of the position of the data transition distribution peak 271 so that the sampling pulses are once more produced in the center of the eye, as shown in FIGS. 22 and 23.

Thus, the symbol phase recovery circuits provide cooperative control with the automatic equalizer 17 for accomplishing in a convenient and accurate manner the initial coarse adjustment of timing wave phase for symbol decoding and the initial coarse adjustment of the equalizer. In each case, and also during start-up, the coarse adjustment is followed by fine adjustment. After start-up, the symbol phase recovery circuits 16 utilize information contained in the outputs of the slicers 210 through 213 to continue supervision of the phase relationship between the data signal and the symbol timing so that an optimum phase position is achieved for sampling pulses utilized in symbol detecting and decoding.

PHASE RECOVERY WITHOUT EYE FINDER

FIG. 34 includes a simplified block and line diagram of a modified form of the invention. In this figure when circuit blocks are employed which are the same as or similar to those hereinbefore employed, they are identified by the same, or similar, reference characters. The circuit of FIG. 34 is adapted to eliminate the eye finder circuits and functions in systems which are not subject to large phase jumps. In other words, it is useful where the largest phase jump which is likely to occur is not large enough to shift the aperture completely off the eye of the data signal wave. Any needed large corrections in the phase difference between the timing wave and the data signal wave are accomplished during the equalizer training period when the timing wave phase is adjusted with respect to the training pulses that are generated in a transmitting station in proper phase with respect to the carrier wave in the transmitter.

The essence of the embodiment of FIG. 34 constitutes the division of the adjustable delay circuit and the reversible counter circuits as well as the digital-to-analog converter circuits into two parts. One part is utilized for coarse phase pull-in during the start-up operation by utilizing the equalizer training pulse peaks in a fashion which is similar to that already described herein. The other part of the circuits is utilized in conjunction with the aperture pulses for final phase adjustment in a fashion which is similar to that previously described herein.

In FIG. 34 the timing wave is received on the lead 56 as before. This wave now, however, need be only equal to the symbol rate for the embodiment of FIG. 34 whereas in the first described embodiment of the invention the timing wave utilized was a second harmonic of that frequency. The timing wave is applied to two tandem connected sections of voltage controllable delay 53' and 53". The delay 53' advantageously includes a first portion of the tandem connected trigger circuits previously employed in FIG. 9, and the delay circuit 53" includes the remainder of such trigger circuits. The output of delay 53" is applied to an aperture and direction control circuit 291 which includes three monopulser circuits 92, 93, and 96 that are arranged for generating aperture pulses on the lead 108, sampling pulses on the lead 152 and up-down control signals for the reversible counters on a pair of leads 97, 98.

Monopulser 92 responds to each timing pulse by producing an output pulse with a deviation which is equal to the width of the desired aperture. Consequently, the output of this monopulser is the train of aperture pulses. Monopulser 93 similarly responds to each timing pulse and produces on the lead 93A a train of pulses each of which has a duration which is approximately equal to one-half of the duration of an aperture pulse. Pulse amplifier 151 is triggered by the trailing edge of each pulse in the output of monopulser 93 and produces a sampling pulse which is centered in the aperture pulse. Monopulser 96 is also triggered by the trailing edge of each pulse on lead 93A in the output of monopulser 93 and produces an output pulse having a duration approximately equal to one-half of a data symbol interval. This latter pulse thus is initiated at the center of each aperture pulse and ends at a subsequent noncritical time between aperture pulses. The output of monopulser 96 is supplied on a two-rail logic basis from the monopulser on the circuits 97 and 98 to two reversible binary counters 50' and 50" for controlling the direction of operation thereof simultaneously.

The counter 50' is utilized for initial phase adjustment and advantageously includes a portion of the counter stages previously employed in the counter 50 of FIG. 10. Counter 50" utilizes the remaining stages for accomplishing continuous phase adjustment thereafter.

Aperture pulses on lead 108 are applied directly to an input of a coincidence gate 299 and, after passing through a phase inverting amplifier 300, to an input of a further coincidence gate 301. Thus, the gate 299 is enabled only during aperture pulses and gate 301 is enabled only in the absence of aperture pulses. Equalizer training pulse peaks are applied from the peak detector 171 of equalizer 117 in FIG. 6 to provide enabling input signals to both of the gates 299 and 301. The start-up operation control signal on lead 192 produced by the operation of the relay 143 in FIG. 8, is applied to enable the gates 299 and 300 only during the start-up operation period. Gate 301 also initially receives an enabling input from the output of the gear shift counter 183.

Assuming a large phase discrepancy between the timing wave on lead 56 and the equalizer training pulses, each such pulse initially operates only the gate 301 for applying drive pulses to the counter 50' on a circuit 173'. Circuit 173' is connected to operate counter 50' in large steps equivalent to the drive utilized on the same lead in FIG. 10 to drive the counter 50. In other words, pulses on lead 173' drive only the five most significant stages of counter 50'. Each pulse on the lead 173' is also coupled to the gear shift counter 183 for resetting that counter as hereinbefore described.

As soon as an equalizer training pulse occurs within the aperture it operates gate 299, and the output of that gate on lead 182 drives counter 50' through the least significant stage thereof and also drives gear shift counter 183. As soon as a predetermined number of successive equalizer pulses have been detected within the aperture, the gear shift counter 183 attains its full count condition and applies an output on the lead 198 for disabling gate 301.

Output signals from counter 50' actuate a digital-to-analog converter 51' which is necessarily of adequate capacity to control the variable delay circuit 53' through a range equivalent to more than 360 electrical degrees of the 2400-c.p.s. symbol clock signal on lead 56. Near the end of equalizer training pulses the signal on lead 192 is restored to its normal negative level to disable the gates 299 and 301. Thereafter data is received and the data signal transition pulses appear on lead 258. These transition pulses are applied through an inverting positive diode NOR gate 303 to a coincidence gate 302, and they are also applied to the transition density detector 279 for enabling the gate 302 only when data signal transitions are occurring at an adequate rate to provide accurate phase control information, all as previously described.

Transition pulses within the aperture actuate gate 302 to supply corresponding drive pulses on a circuit 280' for driving the counter 50" at the least significant stage thereof. The output of counter 50" is applied through a digital-to-analog converter 51" for controlling the variable delay 53". Delay 53" need have a range of operation which is only slightly larger than the duration of an aperture pulse, since counter 50" is not large enough to shift symbol clock phase through a range equivalent to the full cycle of the timing wave.

It is unnecessary in this embodiment to have a timing wave which includes a clock signal transition midway between adjacent symbols since this embodiment does not exercise control over phase with respect to the long time probability distribution peak of data signal transitions. The control is exercised symmetrically about equalizer training pulse peaks initially and about aperture pulses thereafter for fine control in response to data signal transitions. It is noted in this connection that the up-down control leads 97 and 98 are coupled to the counters 50' and 50" in opposite phase so that it is not necessary to employ the plural phase reversing gates that were utilized in the direction control 132 of FIG. 9.

Since the eye finder signals are not utilized in FIG. 34, the circuit displays no tendency to drift out of phase synchronism with the data eye as might otherwise be the case if a long interval of relatively low data transition rate should occur. In such a case the absence of data transitions within the aperture permits the eye finder to have complete control and adjust timing phase to the condition illustrated in FIGS. 17 through 21 if there is lingering distortion in the data signal. This assumes, of course, that the transition density detector 279 responds to a transition density which is adequate to maintain data transition steering gates enabled even though there are no data transitions within the aperture. In the embodiment of FIG. 33 this drift of the phase condition cannot take place because the absence of data transitions within the aperture disables gate 302. Consequently, the two counters 50' and 50" are both disabled and the delay circuits 53' and 53" remain in the conditions in which they were set by the last equalizer training pulse and the last series of data transition pulses, respectively.

Although the present invention has been described with reference to particular embodiments thereof, it is to be understood that additional embodiments and modifications which utilize the underlying principles of the invention and will be obvious to those skilled in the art are included within the scope of the invention.

What is claimed is:
1. In combination,
 a transmission circuit for signals having a suppressed carrier frequency;
 an automatic equalizer coupled to said circuit and operable in successive coarse steps and fine steps to provide an impedance for compensating input signals in accordance with the characteristic impulse response of said transmission circuit;
 means decoding signals in the output of said equalizer in response to timing pulses applied thereto;
 means deriving from said signals on said transmission circuit timing pulses recurring at a frequency which is equal to said suppressed carrier frequency;
 said transmission circuit signals including in the initial portion thereof a predetermined train of start-up signals;
 means adjusting the phase of said timing pulses in coarse steps in response to a first predetermined portion of said start-up signals, said coarse steps adjusting the phase of said timing pulses toward phase coincidence signals;
 means responsive to a predetermined maximum phase discrepancy between said start-up signals and said timing pulses for controlling said phase adjusting means to adjust the phase of said timing pulses toward the phase of said start-up signals in fine steps, said controlling means simultaneously supplying a signal to said equalizer for commencing the adjustment thereof in coarse steps;
 means responsive to the completion of said coarse steps of equalizer initialization for terminating said fine steps of timing pulse phase adjustment; and
 means responsive to the termination of said train of start-up signals operating said timing pulse phase adjusting means in response to transitions of said transmission circuit signals through predetermined signal levels in accordance with the characteristic distribution for said transitions.

2. In combination:
means receiving signals wherein each successive signal interval includes signal symbols representing an amplitude level coded information character;
means responsive to said signal generating an oscillation wave of predetermined frequency;
means adjusting the phase of said wave in fine steps in response to each transition of said signal between any two information-determinant code levels thereof; and
means adjusting the phase of said recovered wave in coarse steps in response to each transition of said signal between any two of said information determinant levels within a predetermined time slot portion of each symbol interval.

3. In combination:
means receiving a multilevel coded signal which includes a succession of signal symbols, each of said symbols displaying a portion of substantially zero slope at one of a plurality of signal code levels, said symbols occurring at a predetermined rate;
means responsive to said signal generating an alternating current wave at a frequency equal to said rate;
means adjusting the phase of said alternating current wave whereby a predetermined point on said wave occurs during said zero slope portion of each signal symbol; and
said adjusting means includes means responsive to the characteristic long time distribution of transitions of said signal among said levels between successive ones of said zero slope portions for actuating said phase adjusting means.

4. The combination in accordance with claim 3 in which:
said phase adjusting means has a range of operation which is greater than 360 electrical degrees of said alternating current wave.

5. The combination in accordance with claim 3 in which:
said receiving means includes means detecting the average rate of occurrence of said transitions and producing an output signal in response to a rate in excess of a predetermined minimum rate; and
means disabling said phase adjusting means in response to the absence of said detecting means output signal.

6. The combination in accordance with claim 5 in which:
said phase adjusting means includes binary memory means producing a control signal corresponding to said transition distribution for maintaining the last phase adjustment condition of said phase adjusting means prior to operation of said disabling means.

7. In combination:
means supplying a first electric signal wave;
means supplying a second electric signal wave;
means responsive to said second wave producing an output signal which is a function of a predetermined amplitude characteristic of such wave;
means integrating the output of said signal producing means; and
means coupled to said integrating means for adjusting the phase of said first wave into a predetermined relationship with respect to said second wave.

8. In combination:
a source of multilevel signals including successive signal symbols in which signal amplitude can have any one of a plurality of information determinant signal levels, said signals being of a type which forms a multilevel eye pattern when successive signal portions thereof are superimposed upon one another;
means discriminating among said information-determinant levels, said discriminating means including means establishing predetermined reference signal slicing levels against which said signals are compared;
means supplying an alternating-current oscillation wave; and
means responsive to the characteristic long time distribution of transitions of said signals through said reference slicing levels between successive eyes of said pattern for adjusting the phase of said wave.

9. In combination:
means supplying trains of multilevel synchronous signals which form a multilevel eye pattern, the signal transitions between different levels of said pattern during times between successive signals symbols defining the width of each eye of said eye pattern;
means supplying an alternating current wave;
means responsive to said wave generating a train of pulses, the duration of each of said pulses being substantially less than a full signal symbol interval but somewhat greater than the width of an eye in said eye pattern;
means detecting transitions of said signals through each of a plurality of predetermined amplitude levels, each such level being within a different eye of said pattern; and
means adjusting the phase of said wave in response to outputs of said detecting means corresponding to said transitions which occur in time coincidence with one of said pulses, said adjusting means effecting a phase condition in which substantially equal numbers of signal transitions through any of said predetermined amplitude levels occur in each half of each of said pulses from a time standpoint.

10. The combination in accordance with claim 9 in which:
said phase adjusting means includes additional means responsive to substantially all signal transition outputs of said detecting means for causing said phase adjusting means to operate but in smaller increments of adjustment than are provided by such transitions which are coincident with said pulses.

11. The combination in accordance with claim 9 in which said phase adjusting means includes:
two reversible counters;
two voltage controlled delay circuits connected in series and coupling said wave to said counters for continuously reversing the direction of operation thereof;
means supplying a train of pulses to drive a first one of said counters prior to each of said signal trains;
means coupling said first counter to control a first one of said delay circuits;
means coupling the output of said detecting means to drive said second counter; and
means coupling said second counter to control a second one of said delay circuits.

12. In combination:
a source of multilevel signals having a predetermined recurrent amplitude characteristics, said signals containing in at least a portion thereof level coded signal symbols representing information and occurring at a predetermined symbol rate;
means generating an oscillation wave at a frequency which is equal to said symbol rate;
reversible counting means;
means deriving from said amplitude characteristic of said signals a train of pulses for driving said counting means;
means continually reversing the direction of operation of said counting means in response to said oscillation wave; and
means adjusting the phase of said wave in response to the output of said counting means, said phase adjusting means comprising:
a digital-to-analog converter coupled to the output of said counting means and continually producing an analog output signal having a magnitude which is a function of the counting condition of said counting means; and
means responsive to said analog signal controlling the phase of said wave.

13. In combination:
means supplying level coded signals having a plurality of information-determinant signal levels, said signals including successive signal symbols occurring at a predetermined symbol rate and wherein each symbol has during a predetermined time slot of the symbol interval thereof a relatively stable amplitude at one of said plurality of information-determinant levels;
means discriminating among said information-determinant levels with respect to predetermined signal slicing reference amplitude levels, said signal having during the symbol interval portions thereof between successive ones of said time slots a long-time signal slicing level transition probability distribution having a peak approximately midway between successive ones of said time slots, said distribution being approximately symmetrical with respect to said peak;
means generating an oscillation wave at a frequency which is equal to the symbol rate of said signals;
reversible counting means;
means driving said counting means in response to said signal transitions through said slicing levels;
means continually reversing the direction of operation of said counting means in response to said oscillation wave; and
means adjusting the phase of said wave in response to the output of said counting means.

14. The combination in accordance with claim 13 which includes, in addition:
means responsive to said oscillation wave generating a train of pulses, each of said pulses being of somewhat longer duration than one of said time slots; and
additional means driving said counting means for adjusting the phase of said wave so that each of said pulses occurs in time coincidence with substantially equal numbers of said signal slicing level transitions in each time half of such pulse.

15. The combination in accordance with claim 13 in which:
said reversible counting means has a ripple time for actuation in response to the application of said signal transitions therto; and
means are provided for inhibiting said driving means for a time interval corresponding to such ripple time during each operation of said reversing means to prevent extension of counter ripple into a reversal of said counting means.

16. The combination in accordance with claim 13 which includes, in addition:
means responsive to time density of occurrence of said signal slice level transitions for inhibiting said driving means for transition densities below a predetermined level.

17. The combination in accordance with claim 13 in which said discriminating means includes:
plural full wave rectification means connected in tandem, the number of said rectification means being equal to $n-1$ for said signals having $2^n$ information-determinant levels;
$n-1$ amplification means each coupled to the output of a different one of said rectification means for amplifying the full wave rectified output thereof to have the same peak-to-peak magnitude as the input thereto, said amplification means further including means shifting the level of the rectified and amplified output thereof to have a new zero-voltage axis corresponding to the one of said signal slicing levels which is at approximately the midamplitude level of the output of such rectification means;
means detecting zero axis crossings both of signals in the outputs of said amplifiers and of said information signals applied to said discriminating means; and
means coupling the output of said detecting means to said driving means.

18. The combination in accordance with claim 13 in which:
said phase adjusting means includes means controlling the operation thereof convergently toward a condition of symmetry with respect to a time slot of low probability of occurrence of said transitions.

19. The combination in accordance with claim 13 in which:
said counting means includes a plurality of stages interconnected for counting operation; and
means coupling said phase adjusting means to only a first predetermined portion of said stages, all of such portion being of higher counting significance than the remaining second portion of said stages.

20. The combination in accordance with claim 19 which includes, in addition:
means responsive to said oscillation wave generating a train of pulses, each of said pulses being of somewhat longer duration than one of said time slots;
additional means driving said counting means for adjusting the phase of said wave so that each of said pulses occurs in time coincidence with substantially equal numbers of said signal slicing level transitions in each time half of such pulse; and
said additional driving means includes means driving one of the stages of said second portion.

21. In combination:
means supplying input signal symbol trains in which each symbol is in a level coded format which may include any one of a predetermined plurality of information-determinant levels and wherein each symbol interval includes a time slot during which the signal is relatively stable at said one signal level;
means generating an oscillation wave at a frequency which is equal to the symbol rate of said signals;
reversible counting means;
means driving said counting means at a selectable one of three different rates of counting operation, said rates including a high rate prior to the start of each train of signals and including during each train of symbols a medium rate in response to data signal appearances within a predetermined maximum phase error angle range of phase error between said signal and said oscillation wave, said rates further including a low rate in response to all signal transitions from one of said levels to an adjacent level;
means continually reversing the direction of operation of said counting means in response to said oscillation wave; and
means adjusting the phase of said wave in response to the output of said counting means.

22. In combination:
a source of multilevel signals having a predetermined recurrent amplitude characteristic, said signals containing in at least a portion thereof level coded signal symbols representing information and occurring at a predetermined symbol rate;
means generating an oscillation wave at a frequency which is equal to said symbol rate;
reversible counting means;
means deriving from said amplitude characteristic of said signals a train of pulses for driving said counting means;
means continually reversing the direction of operation of said counting means in response to said oscillation wave; and means adjusting the phase of said wave in response to the output of said counting means, said counting means having a range of counting operation which is adapted to effect operation of said phase adjusting means through a range which is greater than 360 electrical degrees of said oscillation wave.

23. A data receiver comprising:

An analog adder responsive to an input data waveform having more than two significant information levels dependent on input data previously sent and to a second signal level set in accordance with previously sent input data, and having an adder signal output which is an algebraic function of the comparison between said incoming data and said second signal level, said adder signal output passing through preselected levels at preselected times;

second signal setting means connected to said analog adder and responsive to said adder signal output for setting said second signal levels; and means for generating a clock timing signal connected to said analog adder and responsive at said preselected times to said preselected levels of said adder signal output for generating said clock timing signals, said generating means including means responsive to said clock timing signals for enabling said generating means to generate said clock timing signals at those points where said adder output signal crosses said predetermined levels and which have a constant phase relationship with one another; said generating means connected to said second signal setting means for supplying said clock timing signals to said second signal setting means.

References Cited

UNITED STATES PATENTS

| | | | |
|---|---|---|---|
| 3,152,305 | 10/1964 | Becker et al. | 325—50 |
| 3,185,963 | 5/1965 | Peterson et al. | |
| 3,196,352 | 7/1965 | Hopner et al. | 325—49 |
| 3,238,299 | 3/1966 | Lender | 325—38 X |

RALPH D. BLAKESLEE, Primary Examiner

U.S. Cl. X.R.

178—68; 325—325, 331